(12) United States Patent
Luo et al.

(10) Patent No.: US 11,907,848 B2
(45) Date of Patent: Feb. 20, 2024

(54) METHOD AND APPARATUS FOR TRAINING POSE RECOGNITION MODEL, AND METHOD AND APPARATUS FOR IMAGE RECOGNITION

(71) Applicant: Tencent Technology (Shenzhen) Company Limited, Shenzhen (CN)

(72) Inventors: Jingmin Luo, Shenzhen (CN); Xiaolong Zhu, Shenzhen (CN); Yitong Wang, Shenzhen (CN); Xing Ji, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 465 days.

(21) Appl. No.: 17/330,261

(22) Filed: May 25, 2021

(65) Prior Publication Data
US 2021/0279456 A1   Sep. 9, 2021

Related U.S. Application Data

(63) Continuation of application No. PCT/CN2020/082039, filed on Mar. 30, 2020.

(30) Foreign Application Priority Data

Apr. 12, 2019   (CN) .......................... 201910294734.8

(51) Int. Cl.
*G06N 3/084*   (2023.01)
*G06T 7/73*   (2017.01)
(Continued)

(52) U.S. Cl.
CPC .............. *G06N 3/084* (2013.01); *G06T 7/74* (2017.01); *G06V 10/764* (2022.01);
(Continued)

(58) Field of Classification Search
CPC .......... G06N 3/084; G06N 3/045; G06T 7/74; G06T 2207/20081; G06T 2207/20084;
(Continued)

(56) References Cited

U.S. PATENT DOCUMENTS

| 2010/0034462 A1* | 2/2010 | Nevatia ................. G06V 10/50 382/190 |
| 2010/0111370 A1* | 5/2010 | Black .................. G06F 18/2321 705/26.1 |
| 2018/0357518 A1 | 12/2018 | Sekii |

FOREIGN PATENT DOCUMENTS

| CN | 107622250 A | 3/2018 |
| CN | 110020633 A | 7/2019 |

OTHER PUBLICATIONS

Edgar Simo-Serra et al., "A Joint Model for 2D and 3D Pose Estimation from a Single Image", 2013 IEEE Conference on Computer Vision and Pattern Recognition, Jun. 28, 2013, ISBN: 978-1-5386-5672-3, 2 pgs.

(Continued)

*Primary Examiner* — Stephen P Coleman
(74) *Attorney, Agent, or Firm* — Morgan, Lewis & Bockius LLP

(57) ABSTRACT

This application provides a method for training a pose recognition model performed at a computer device. The method includes: inputting a sample image labeled with human body key points into a feature map model included in a pose recognition model, to output a feature map of the sample image; inputting the feature map into a two-dimensional (2D) model included in the pose recognition model, to output 2D key point parameters used for representing a 2D human body pose; input a target human body feature map cropped from the feature map and the 2D key point parameter into a three-dimensional (3D) model included in the pose recognition model, to output 3D pose parameters (Continued)

used for representing a 3D human body pose; constructing a target loss function based on the 2D key point parameters and the 3D pose parameters; and updating the pose recognition model based on the target loss function.

20 Claims, 13 Drawing Sheets

(51) Int. Cl.
  *G06V 40/10* (2022.01)
  *G06V 20/64* (2022.01)
  *G06V 10/764* (2022.01)
  *G06V 40/20* (2022.01)
(52) U.S. Cl.
  CPC .......... *G06V 20/647* (2022.01); *G06V 40/10* (2022.01); *G06V 40/103* (2022.01); *G06V 40/23* (2022.01)
(58) Field of Classification Search
  CPC ............ G06T 2207/30196; G06T 7/75; G06V 10/764; G06V 20/647; G06V 40/10; G06V 40/103; G06V 40/23; G06F 18/214

USPC ........................................................ 382/103
See application file for complete search history.

(56) References Cited

OTHER PUBLICATIONS

Tencent Technology, ISR, PCT/CN2020/082039, dated Jul. 2, 2020, 3 pgs.
Yasunori Kudo et al., "Unsupervised Adversarial Learning of 3D Human Pose from 2D Joint Locations", Mar. 22, 2018, 3 pgs., Retrieved from the Internet: https://arxiv.org/abs/1803.08244v1.
Zhe Cao et al., "OpenPose: Realtime Multi-Person 2D Pose Estimation Using Part Affinity Fields", Dec. 18, 2018, 2 pgs., Retrieved from the Internet: https://arxiv.org/abs/1812.08008v1.
Tencent Technology, WO, PCT/CN2020/082039, Jul. 2, 2020, 6 pgs.
Tencent Technology, IPRP, PCT/CN2020/082039, Sep. 28, 2021, 7 pgs.

* cited by examiner

METHOD AND APPARATUS FOR TRAINING POSE RECOGNITION MODEL, AND METHOD AND APPARATUS FOR IMAGE RECOGNITION

CROSS-REFERENCE TO RELATED APPLICATIONS

This application is a continuation application of PCT Patent Application No. PCT/CN2020/082039, entitled "METHOD FOR TRAINING POSTURE RECOGNITION MODEL, AND IMAGE RECOGNITION METHOD AND APPARATUS" filed on Mar. 30, 2020, which claims priority to Chinese Patent Application No. 201910294734.8, filed with the State Intellectual Property Office of the People's Republic of China on Apr. 12, 2019, and entitled "METHOD AND APPARATUS FOR TRAINING POSE RECOGNITION MODEL, AND METHOD AND APPARATUS FOR IMAGE RECOGNITION", all of which are incorporated herein by reference in their entirety.

FIELD OF THE TECHNOLOGY

This application relates to the field of machine Learning (ML) technologies, and in particular, to a pose recognition technology.

BACKGROUND OF THE DISCLOSURE

ML is a branch of artificial intelligence, and its aim is to allow a machine to learn according to priori knowledge to acquire the logical abilities to perform classification and prediction. ML models represented by neural networks are continuously developed, and are gradually applied to human body pose recognition, thereby implementing various intelligent applications based on human body poses.

In the related art, neural network models for recognizing two-dimensional (2D) pose information and three-dimensional (3D) pose information of a human body are incompatible with each other and need to be trained separately. The training requires a large quantity of computing resources, and the training efficiency is low.

SUMMARY

Embodiments of this application provide a method and an apparatus for training a pose recognition model, a method and an apparatus for image recognition based on a pose recognition model, and a storage medium, to implement a model compatible with 2D pose information and 3D pose information of a human body.

The embodiments of this application provide a method for training a pose recognition model, including:
  processing, by using a feature map model included in a pose recognition model, a sample image labeled with human body key points, to obtain a feature map of the sample image;
  processing the feature map of the sample image by using a 2D model included in the pose recognition model, to obtain 2D key point parameters used for representing a 2D human body pose;
  processing, by using a 3D model included in the pose recognition model, a target human body feature map cropped from the feature map and the 2D key point parameter, to obtain 3D pose parameters used for representing a 3D human body pose;
  constructing a target loss function based on the 2D key point parameters and the 3D pose parameters; and
  updating the pose recognition model based on the target loss function.

The embodiments of this application further provide a method for image recognition based on a pose recognition model, including:
  processing, by using the feature map model included in the pose recognition model, a to-be-recognized image including a human body, to obtain a feature map of the to-be-recognized image;
  processing the feature map of the to-be-recognized image by using the 2D model comprised in the pose recognition model, to obtain 2D key point parameters used for representing a 2D human body pose in the to-be-recognized image; and
  processing, by using the 3D model comprised in the pose recognition model, a target human body feature map cropped from the feature map and the 2D key point parameters, to obtain 3D pose parameters used for representing a 3D human body pose in the to-be-recognized image.

The embodiments of this application further provide an apparatus for training a pose recognition model, including:
  a first processing unit, configured to process, by using a feature map model included in a pose recognition model, a sample image labeled with human body key points, to obtain a feature map of the sample image;
  a second processing unit, configured to process the feature map of the sample image by using a two-dimensional (2D) model included in the pose recognition model, to obtain 2D key point parameters used for representing a 2D human body pose;
  a third processing unit, configured to process, by using a 3D model included in the pose recognition model, a target human body feature map cropped from the feature map and the 2D key point parameter, to obtain 3D pose parameters used for representing a 3D human body pose;
  a construction unit, configured to construct a target loss function based on the 2D key point parameter and the 3D pose parameter; and
  an updating unit, configured to update the pose recognition model based on the target loss function.

In the foregoing solution, the apparatus further includes:
  a labeling unit, configured to determine the human body key points in the key point set according to a setting; and
  label the sample image based on the human body key points and with reference to the key point set.

In the foregoing solution, the key point set includes:
  reference key points used for localization of human body parts and extension key points, which, together with the reference key points, represent a plurality of 3D poses of the parts to which the reference key points and the extension key points belong.

In the foregoing solution, the target loss function includes a first loss function corresponding to the 3D model.

The construction unit is further configured to determine corresponding 2D key point information based on the 3D pose parameter; and
  construct the first loss function based on the 2D key point parameter and the 2D key point information.

In the foregoing solution, the target loss function further includes a loss function corresponding to the 2D model and a second loss function corresponding to the 3D model. The 2D key point parameter includes a part affinity field (PAF)

parameter of the human body key points and a heatmap of the human body key points, and the 3D pose parameter includes a shape parameter and a pose parameter of a human body.

The construction unit is further configured to construct the loss function corresponding to the 2D model based on a difference between a PAF parameter outputted by the 2D model and the PAF parameter of the human body key points in the sample image and a difference between a heatmap outputted by the 2D model and the heatmap of the corresponding human body key points in the sample image; and construct the second loss function corresponding to the 3D model based on a difference between a shape parameter outputted by the 3D model and the shape parameter of the corresponding human body in the sample image and a difference between a pose parameter outputted by the 3D model and the pose parameter of the corresponding human body in the sample image.

In the foregoing solution, the apparatus further includes:
a cropping unit, configured to determine the target human body in the feature map based on the 2D key point parameter; and
crop the feature map according to the target human body, to obtain the target human body feature map.

In the foregoing solution, the updating unit is further configured to determine a value of the target loss function based on the 2D key point parameter and the 3D pose parameter;
determine an error signal of the pose recognition model based on the target loss function in a case that the value of the target loss function exceeds a preset threshold; and
back-propagate the error signal in the pose recognition model, and update a model parameter of each layer during the propagation.

The embodiments of this application further provide an apparatus for image recognition based on a pose recognition model, including:
a first acquisition unit, configured to input a to-be-recognized image including a human body into a feature map model included in the pose recognition model, to output a feature map corresponding to the to-be-recognized image;
a second acquisition unit, configured to input the feature map into a 2D model included in the pose recognition model, to output a 2D key point parameter used for representing a 2D human body pose, the 2D key point parameter being used for recognizing a 2D pose of the human body; and
a third acquisition unit, configured to input a target human body feature map cropped from the feature map and the 2D key point parameter into a 3D model included in the pose recognition model, to output a 3D pose parameter used for representing a 3D human body pose, the 3D pose parameter being used for recognizing a 3D pose of the human body.

In the foregoing solution, the apparatus further includes:
a matching unit, configured to recognize a 2D pose of the human body in the to-be-recognized image based on the 2D key point parameter, the to-be-recognized image being acquired based on an outputted image of a specific human pose;
perform similarity matching between the 2D pose and the specific human pose, to obtain a matching result; and
a prompting unit, configured to output prompt information used for representing the matching result.

In the foregoing solution, the apparatus further includes:
a human body model unit, configured to construct, based on the 3D pose parameter, a 3D human body model corresponding to the target human body; and
a control unit, configured to control the 3D human body model to perform a target action, the target action matching an action performed by the target human body.

The embodiments of this application further provide a computer device, including:
a memory, configured to store executable instructions; and
a processor, configured to implement, when executing the executable instructions stored in the memory, the method for training a pose recognition model or the method for image recognition based on a pose recognition model according to any one of the embodiments of this application.

The embodiments of this application further provide a non-transitory computer readable storage medium, storing executable instructions, the executable instructions, when executed by a processor of a computer device, being used for implementing the method for training a pose recognition model or the method for image recognition based on a pose recognition model according to any one of the embodiments of this application.

Application of the embodiments of this application has the following beneficial effects:

When the pose recognition model is trained, a sample image labeled with human body key points is processed by using the feature map model included in the pose recognition model, to obtain a feature map of the sample image. Subsequently, the feature map is processed by using the 2D model included in the pose recognition model, to obtain a 2D key point parameter used for representing a 2D human body pose, and a target human body feature map cropped from the feature map and the 2D key point parameter are processed by using the 3D model included in the pose recognition model, to obtain a 3D pose parameter used for representing a 3D human body pose. A target loss function is constructed based on the 2D key point parameter and the 3D pose parameter. Because an output result (2D key point parameter) of the 2D model and an output result (3D pose parameter) of the 3D model are considered in the target loss function, after a model parameter of the pose recognition model is updated based on the target loss function, the 2D model and the 3D model in the obtained pose recognition model can output better results. That is, the trained pose recognition model not only can output 2D pose information of the human body, but also can output 3D pose information of the human body, thereby achieving compatibility with the 2D pose information and the 3D pose information of the human body. In addition, for the training of the pose recognition model that outputs the 2D pose information and the 3D pose information of the human body, one set of training samples is used, so that the model is simple, and the training efficiency is high.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

A human body key point is a representative key point for a human body pose, and a human body pose can be recognized by using the human body key point. In an actual application, the human body key point may be a bone key point of a human body, and the bone is a connection line between the human body key points such as a head key point, a neck key point, a shoulder key point, an elbow key point, a wrist key point, an ankle key point, a knee key point, and a crotch key point.

In the related art, human body pose recognition is implemented by using a key point recognition model, to implement various intelligent applications based on human body poses.

Figure 1:
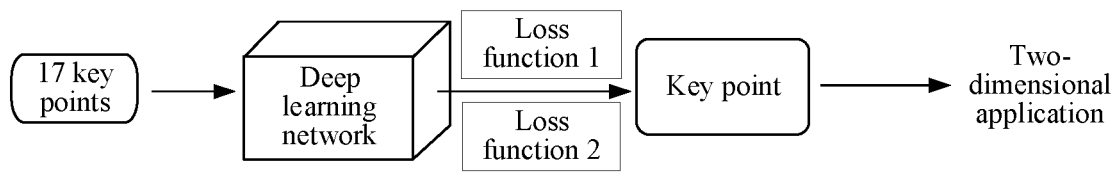
FIG. 1 is a schematic diagram of a method for training a 2D key point recognition model according to the related art.

FIG. 1 is a schematic diagram of a method for training a 2D key point recognition model according to the related art. Referring to FIG. 1, training samples used for training a 2D key point recognition model are obtained from a COCO database (image data set). A solution including 17 human body key points disclosed by the COCO database is used for training. Image data in which 17 human body key points are labeled is used as a training sample. A feature map is extracted from sample data by using a deep learning network (for example, a network referred to as Darknet), and then, is subject to part affinity field (PAF) and heatmap processing, is trained by using Loss of a loss function 2, for example, L2, and non-maximum suppression (NMS) and a Grouping operation are performed to obtain 2D human body key points and an owner of the human body key points.

The PAF is explained herein. The PAF processing is used for multi-human body key point detection, and a position and a direction of the limb are represented (a degree of an association between the two key points is also represented) by using a set of 2D direction vectors, thereby resolving the problem of a person to which the human body key point belong. A Grouping operation is performed on 2D direction vectors of the human body key points obtained based on the PAF, so that specific persons to which the key points respectively belong in the image can be determined. After the Grouping operation, the human body key points can be connected into a skeleton.

In some implementations, a solution including 18 human body key points of Openpose (a fully functioned library) and a basic solution using 8 human body key points may alternatively be used for recognizing a 2D human body pose.

Figure 2:
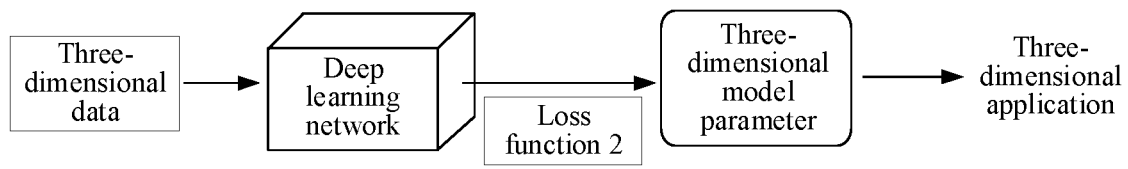
FIG. 2 is a schematic diagram of a method for training a 3D human body model according to the related art.

FIG. 2 is a schematic diagram of a method for training a 3D human body model according to the related art. Referring to FIG. 2, a sample data set is constructed by using a standard of a skinned multi-person linear model (SMPL). A sample image is inputted. The sample image carries a shape and a pose. Parameters (the shape and the pose) of an SMPL 3D model are outputted for 3D model training, and L2 Loss is used to regress the parameters.

Through the foregoing descriptions of the 2D pose information model of the human body and the 3D human body model in the related art, it can be learned that:

For the 2D key point recognition model, regardless of whether 17-key point solution of the COCO database or 18-key point solution of Openpose is used, one set of human body key points is always used for training, and there are redundancy and defects in the key point information in response to different services. For example, in a scenario in which only 2D upper-body simple pose information is needed, only 8 key points of the upper body are needed, and in this case, using 17 key points or 18 key points for model training is obviously key point redundancy, resulting in a waste of computing resources.

For the 3D human body model, the model parameters used in the training of the foregoing SMPL model are a shape parameter of the human body and a pose parameter of the human body, and constraints of 2D information are not considered. Consequently, a pose action of the human body recognized by the model obtained through training may have an angle error, the action is not accurate enough, that is, the recognition accuracy is low, and the model also has problems of key point information redundancy and defects in different service scenarios. For example, in a scenario in which only a 3D model of the upper body is needed for human-computer interaction, training the 3D model corresponding to the entire human body obviously results in a waste of computing resources.

The foregoing two types of models (a model corresponding to 2D information recognition and a 3D human body model) use completely different training data, are incompatible with each other, and have different training procedures. If both the 2D pose information of the human body and the 3D pose information of the human body need to be obtained, two different models need to be trained separately, and different data needs to be processed, which not only is time-consuming, but also causes a waste of computing resources and the high occupancy of resources such as a central processing unit (CPU) and a graphics processing unit (GPU).

Based on this, a pose recognition model of the embodiments of this application is provided, the pose recognition model obtained through training not only can output 2D pose information of a human body, but also can output 3D pose information of the human body, thereby achieving compatibility with the 2D pose information and the 3D pose information of the human body. In addition, the pose recognition model that outputs the 2D pose information and the 3D pose information of the human body is trained by using one set of training samples, so that the model is simple, and the training efficiency is high. The pose recognition model includes a 3D model. Training of the 3D model is constrained by using 2D information outputted by a 2D model, so that 3D pose information of a human body outputted by the 3D model has higher accuracy.

It is to be emphasized that, the method for training a pose recognition model and the method for image recognition provided in the embodiments of this application may be implemented based on artificial intelligence (AI). Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. AI software technologies mainly include several major directions such as a computer vision (CV) technology, a speech technology, a natural language processing technology, and ML/deep learning.

The solutions provided in the embodiments of this application include technologies such as ML/deep learning of AI and CV. ML is a multi-field interdisciplinary subject involving the probability theory, statistics, the approximation theory, convex analysis, the algorithm complexity theory, and the like. The ML specializes in studying how a computer simulates or implements a human learning behavior to obtain new knowledge or skills, and reorganize an existing knowledge structure to keep improving its performance. The ML is the core of the AI, is a basic way to make the computer intelligent, and is applied to various fields of the AI. ML and deep learning generally include technologies such as an artificial neural network, a belief network, reinforcement learning, transfer learning, inductive learning, and learning from demonstrations.

In the embodiments of this application, the pose recognition model is specifically trained through ML, so that the pose recognition model obtained through training can accurately perform pose recognition for a to-be-recognized image.

In a process of training a pose recognition model or performing pose recognition, the CV technology may also be included. The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data.

In the embodiments of this application, technologies, such as image processing and image semantic understanding, in the CV technology are specifically included. For example, after an image, for example, a to-be-recognized image or a training sample, is obtained, image processing is performed, for example, the image is cropped, and so on. In another example, the image semantic understanding technology is used for labeling key points, classifying an image (for example, determining an owner of a human body key point), extracting image features (feature map), and the like.

Figure 3:
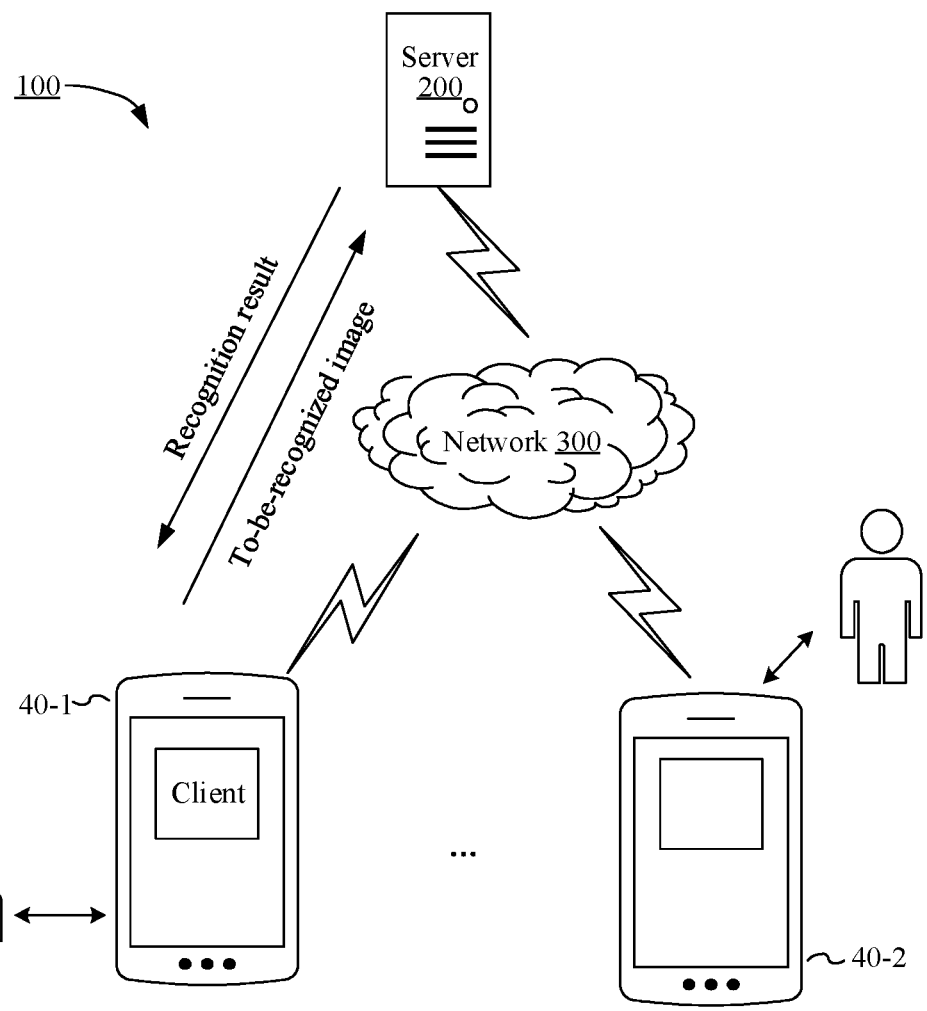
FIG. 3 is a schematic diagram of an implementation scenario of a pose recognition model according to an embodiment of this application.

First, an implementation scenario in which the pose recognition model of this application is described. FIG. 3 is a schematic diagram of an implementation scenario of a pose recognition model according to an embodiment of this application. Referring to FIG. 3, to support an exemplary application, a terminal (including a terminal 40-1 and a terminal 40-2) is equipped with a client for image recognition, and the terminal is connected to a server 200 by using a network 300. The network 300 may be a wide area network, a local area network, or a combination of the two, and achieves data transmission by using a radio link.

The server 200 is configured to input a sample image labeled with human body key points into a feature map model included in a pose recognition model, to output a feature map of the sample image; input the feature map into a 2D model included in the pose recognition model, to output a 2D key point parameter used for representing a 2D human body pose; input a target human body feature map cropped from the feature map and the 2D key point parameter into a 3D model included in the pose recognition model, to output a 3D pose parameter used for representing a 3D human body pose; construct a target loss function based on the 2D key point parameter and the 3D pose parameter; and update a model parameter of the pose recognition model based on the target loss function. In this way, training of the pose recognition model is implemented.

The terminal (the terminal 40-1 and/or the terminal 40-2) is configured to transmit a recognition request carrying a to-be-recognized image to the server 200, the to-be-recognized image including one or more human bodies.

The server 200 is further configured to receive the recognition request transmitted by the terminal, recognize the to-be-recognized image by using the obtained pose recognition model, and return a recognition result (2D key point parameter and/or 3D pose parameter) to the terminal.

The terminal (the terminal 40-1 and/or the terminal 40-2) is further configured to execute a corresponding application based on the recognition result returned by the server 200, for example, drive a 3D human body model, determine a corresponding 2D human body pose based on the recognition result, and perform corresponding evaluation.

An apparatus for training a pose recognition model and an apparatus for image recognition based on a pose recognition model provided in the embodiments of this application are described below. The apparatus for training a pose recognition model and the apparatus for image recognition based on a pose recognition model in the embodiments of this application can both be implemented by using an image processing device. The image processing device, for example, may be a terminal or a server. That is, the method provided in the embodiments of this application may be implemented by a terminal, such as a smartphone, a tablet computer, and a desktop computer, separately, or may be implemented a server separately, or may be implemented by a terminal and a server in cooperation. The apparatus for training a pose recognition model and the apparatus for image recognition based on a pose recognition model provided in the embodiments of this application may be implemented in a manner of hardware, software, or a combination of hardware and software. The following describes, by using the apparatus for training a pose recognition model in the embodiments of this application as an example, various exemplary implementations of the apparatuses provided in the embodiments of this application.

Figure 4:
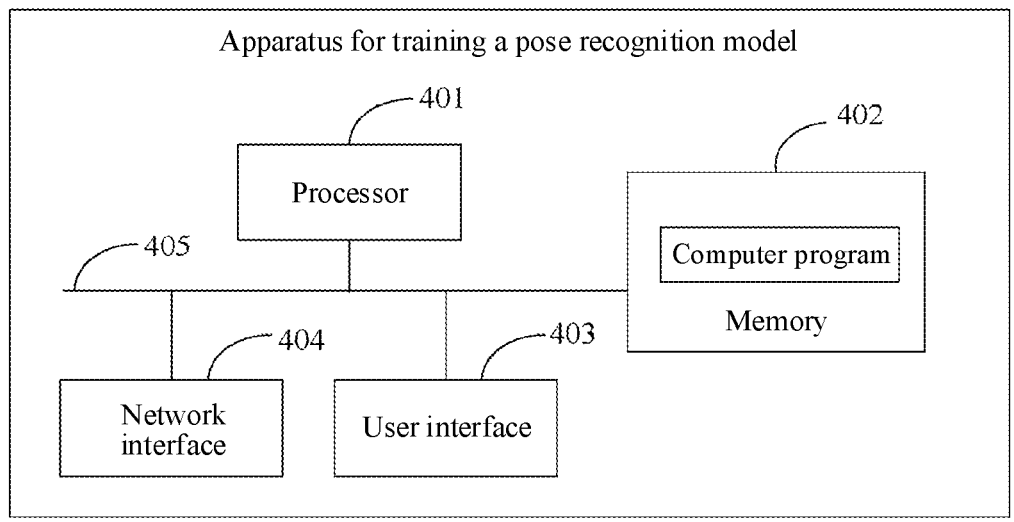
FIG. 4 is a schematic diagram of a composition structure of an apparatus for training a pose recognition model according to an embodiment of this application.

A hardware structure of the image processing device in the embodiments of this application is described below in detail. FIG. 4 is a schematic diagram of a composition structure of an image processing device according to an embodiment of the present disclosure. It may be understood that, FIG. 4 shows only an exemplary structure rather than a complete structure of the image processing device. The structure shown in FIG. 4 may be partially or entirely implemented based on requirements.

The image processing device provided in this embodiment of this application includes: at least one processor 401, a memory 402, a user interface 403, and at least one network interface 404. Various components in an apparatus for training a pose recognition model 40 are coupled together through a bus system 405. It may be understood that the bus system 405 is configured to implement connection and communication between the components. In addition to a data bus, the bus system 405 further includes a power bus, a control bus, and a state signal bus. However, for ease of clear description, all types of buses are labeled as the bus system 405 in FIG. 4.

The user interface 403 may include a display, a keyboard, a mouse, a track ball, a click wheel, a key, a button, a touch panel, a touchscreen, or the like.

It may be understood that, the memory 402 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), a flash memory, and the like. The volatile memory may be a random access memory (RAM), used as an external cache. According to exemplary but not limited descriptions, many forms of RAMs are available, for example, a static random access memory (SRAM), a synchronous static random access memory (SSRAM), and the like. The memory 402 described in this embodiment of this application is to include the memories and any other suitable type of memories.

The memory 402 in the embodiments of this application can store data to support operation of the terminal (for example, 40-1). An example of the data includes any computer program to be operated on the terminal (for example, 40-1), for example, an operating system and an application program. The operating system includes various system programs, such as framework layers, kernel library layers, and driver layers used for implementing various basic services and processing hardware-based tasks. The application program may include various application programs.

For example, the image processing device provided in the embodiments of this application is implemented by a combination of software and hardware. The image processing device provided in the embodiments of this application may be directly embodied as a combination of software modules executed by the processor 401. The software module may be located in a storage medium, the storage medium is located in the memory 402, and the processor 401 reads executable instructions included in the software module in the memory 402, and implements, in combination with necessary hardware (for example, including a processor 401 and another component connected to the bus 405), the method for training a pose recognition model provided in the embodiments of this application.

For example, the processor 401 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In an example in which the image processing device provided in the embodiments of this application is implemented by hardware, the data processing apparatus provided in the embodiments of the present disclosure may be directly executed by using the processor 401 in the form of a hardware decoding processor, for example, one or more ASICs, DSPs, PLDs, CPLDs, FPGAs, or other electronic elements, to execute the method for training a pose recognition model provided in the embodiments of this application.

The memory 402 in the embodiments of this application is configured to store various types of data to support operation of the image processing device 40. An example of the data includes: any executable instruction to be operated on the image processing device for example, an executable instruction. A program that implements the method for training a pose recognition model of the embodiments of this application may be included in the executable instruction.

Based on the foregoing descriptions of implementation scenarios of the pose recognition model and the image processing device in the embodiments of this application, scenarios or fields to which the pose recognition model of the embodiments of this application is applied are described. The pose recognition model of the embodiments of this application is not limited to the scenarios or fields mentioned below:

1. Man-Machine Interaction:

An example in which a user interacts with a terminal is used. A client is configured on the terminal. In an actual application, the client may be a game client, a 3D human body modeling client, or the like. A graphical interface, an image acquisition apparatus, and a processing chip may be further configured on the terminal. An image including a human body is acquired by using the image acquisition apparatus. A 2D human body pose and a 3D human body pose of the human body in the image are recognized based on a pose recognition model.

An example in which the client is a game client is used. The terminal displays an action of a game role by using the graphical interface, so that the user performs imitation based on the action of the role displayed by the terminal, acquires, by using the image acquisition apparatus, an action made by the user, recognizes a 2D human body pose of the human body in the image based on the pose recognition model, and performs evaluation, for example, scoring, in the game based on a similarity between a recognition result and the action made by the role in the game.

An example in which the client is a somatosensory game client as an example. The terminal acquires, by using the image acquisition apparatus, an image including the user, recognizes a 3D human body pose of a human body in the image based on the pose recognition model, to construct a 3D human body model corresponding to the user, and drives the constructed 3D human body model to perform an action the same as that of the user, thereby implementing somatosensory interaction of the user in the game.

An example in which the user interacts with an intelligent robot as an example. An image acquisition apparatus and a processing chip are configured in the intelligent robot. The image acquisition device can acquire an image of a region in front of the intelligent robot. The processing chip can recognize a human body pose in the image of the region based on the pose recognition model, and control the intelligent robot to make a preset response when the recognized human body pose is a preset pose. For example, when the recognized human body pose is a waving pose, an intelligent robot is controlled to make a greeting action.

2. Unmanned Driving:

An image acquisition apparatus and a processing chip are configured on an unmanned vehicle. The image acquisition apparatus can acquire an image in front of the unmanned vehicle in a traveling process. The processing chip recognizes a human body pose (2D and/or 3D) in the image based on the pose recognition model, to determine whether there is a person in front and information such as a current position of the person in front, to control the unmanned vehicle to decelerate or brake, and so on.

3. Medical Field:

An image acquisition apparatus and a processing chip are configured on a medical device. The image acquisition apparatus can acquire an image of a user. The processing chip recognizes a 3D human body pose in the image based on the pose recognition model, to construct a 3D human body model corresponding to the user, and performs medical analysis based on the constructed 3D human body model.

4. Surveillance Field:

A surveillance system includes a front-end image acquisition device and a back-end image processing device. The image acquisition device acquires an image including a user and then, transmits the image to the image processing device. The image processing device recognizes a human body pose (2D and/or 3D) in the image based on the pose recognition model, and performs target tracking, pose analysis and early warning, and the like based on a recognition result.

Figure 5:
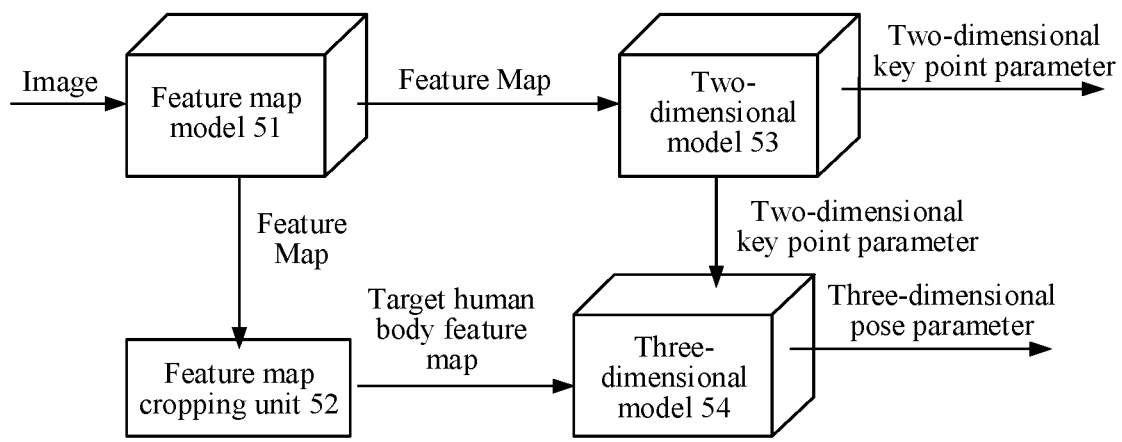
FIG. 5 is a schematic structural diagram of a pose recognition model according to an embodiment of this application.

Before the method for training a pose recognition model provided in the embodiments of this application is described, a structure of the pose recognition model provided in the embodiments of this application is described first. FIG. 5 is a schematic structural diagram of a pose recognition model according to an embodiment of this application. Referring to FIG. 5, the pose recognition model provided in the embodiments of this application includes: a feature map model 51, a feature map cropping unit 52, a 2D model 53, and a 3D model 54. The feature map model 51 is configured to perform feature extraction on an inputted image, to obtain a corresponding feature map. The feature map cropping unit 52 is configured to crop the feature map outputted by the feature map model, to obtain a target human body feature map. The 2D model 53 is configured to recognize the feature map outputted by the feature map model, to output a 2D key point parameter used for representing a 2D human body pose. The 3D model 54 is configured to process the target human body feature map cropped by the feature map cropping unit crop and the 2D key point parameter outputted by the 2D model, to output a 3D pose parameter used for representing a 3D human body pose.

Figure 6:
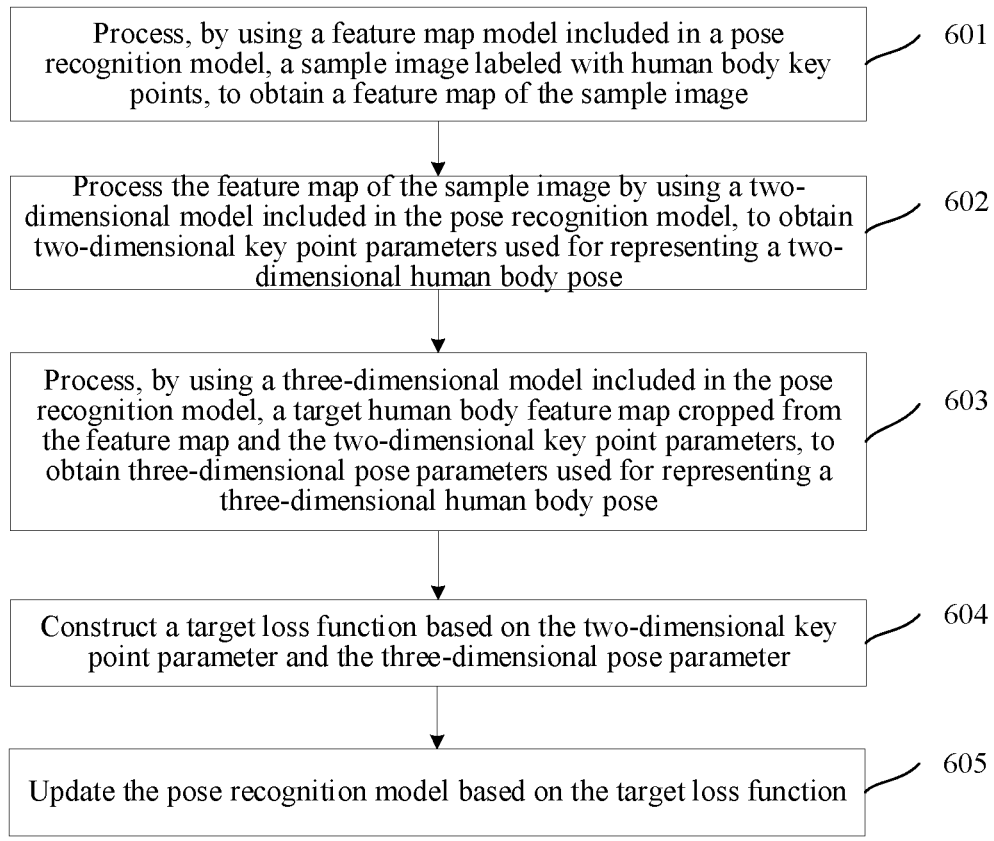
FIG. 6 is a schematic flowchart of a method for training a pose recognition model according to an embodiment of this application.

Based on the foregoing description on the structure of the pose recognition model, the method for training a pose recognition model provided in the embodiments of this application is described below. FIG. 6 is a schematic flowchart of a method for training a pose recognition model according to an embodiment of this application. In some embodiments, the method for training may be implemented by a server or a terminal or may be implemented by a server or a terminal in cooperation. An example in which the method for training is implemented by a server, for example, a server 200 in FIG. 3, is used. With reference to FIG. 5 and FIG. 6, the method for training a pose recognition model provided in the embodiments of this application includes:

Step 601: Process, by using a feature map model included in a pose recognition model, a sample image labeled with human body key points, to obtain a feature map of the sample image.

The server inputs a sample image labeled with human body key points into a feature map model included in a pose recognition model, to output a feature map of the sample image by using the feature map model.

During actual implementation, before the pose recognition model is trained, a sample image used for model training needs to be constructed. The sample image includes a human body. The server labels the sample image including the human body with human body key points. In some embodiments, a plurality of settings are included. Different settings correspond to different quantities of human body key points in a key point set. After determining, according to the settings, human body key points corresponding to a current setting in the key point set, the server labels a sample image including a human body with human body key points based on the determined human body key points and with reference to the key point set.

The key point set is described herein. In some embodiments, the key point set includes: reference key points used for localization of human body parts and extension key points, which, together with the reference key points, represent a plurality of 3D poses of the parts to which the reference key points and the extension key points belong.

In an actual application, the reference key points may be 17 human body key points provided in a COCO data set, and the extension key points, together with one or more of the 17 human body key points, represent different 3D poses of the parts to which the reference key points and the extension key points belong. For example, to represent a 3D pose of the head of the human body, an extension key point may be a crown key point and/or a chin key point, and cooperate with a nose tip key point (reference key point) to represent an action such as head raising, nodding, or head turning. In another example, to represent a 3D pose of a hand of the human body, an extension key point may be at least one of a thumb key point, a palm key point, and a middle finger key point, and cooperates with a wrist key point (reference key point) to represent a 3D pose of the hand such as rotation of the wrist. In another example, to represent a 3D pose of the waist of the human body, an extension key point may be a crotch key point, and cooperate with a left hip key point and/or a right hip key point (reference key point) to represent a 3D pose of the waist such as wriggling of the waist. In some embodiments, a quantity of extension key points is 16, and form, together with the 17 human body key points provided in the COCO data set, a 33-key point set.

Subsequently, obtaining of extension key points in the key point set is described. During actual implementation, the extension key points may be obtained in a manner such as mean point addition and separate recognition. For example, a midpoint of the left hip key point and the right hip key point is obtained in a mean point addition manner as a crotch key point, and a midpoint between a left shoulder key point and a right shoulder key point is obtained in a mean point addition manner as a neck (Huagai point) key point. Hand and foot key points of the human body can be obtained through separate recognition. Specifically, a hand and/or foot recognition model may be constructed, or a hand and/or foot recognition model in the related art may be used. An image including a hand or a foot is inputted, and corresponding extension key point information is outputted.

Figure 7:
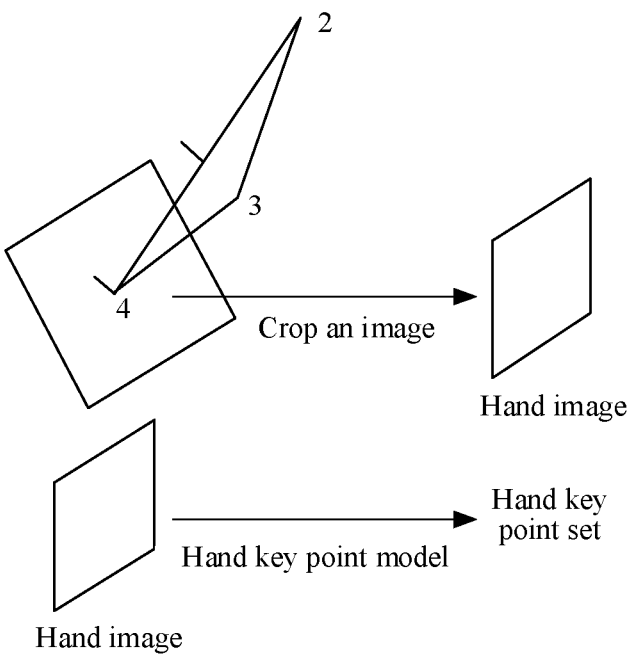
FIG. 7 is a schematic flowchart of obtaining a hand extension key point according to an embodiment of this application.

Exemplarily, obtaining a hand extension key point is used as an example for description. FIG. 7 is a schematic flowchart of obtaining a hand extension key point according to an embodiment of this application. Referring to FIG. 7, first, an image including a human body is cropped, to obtain an image of a hand, and then, the image obtained through cropping is inputted into a hand key point model, to obtain a hand key point set including a thumb key point, a palm key point, and a middle finger key point.

Acquisition of an image of the hand or the foot of the human body is described herein. Still referring to FIG. 7, in some embodiments, the image of the hand can be obtained through cropping in the following manner: A square image including the hand is obtained through cropping by using a wrist key point as a center and using a length between the wrist key point and a corresponding shoulder key point as a side length or a length between the wrist key point and a corresponding elbow key point as a side length, and inputted as a hand key point model. In some embodiments, the image of the foot can be obtained through cropping in the following manner: A square image including the foot is obtained through cropping by using an ankle key point as a center and using a length between the ankle key point and a corresponding knee key point as a side length or a length between the ankle key point and a corresponding hip key point as a side length, and inputted as a foot key point model.

Exemplarily, still referring to FIG. 7, in FIG. 7, a number 2 corresponds to a right shoulder key point of the human body, a number 3 corresponds to a right elbow key point, and a number 4 corresponds to a right wrist key point. The image is cropped by using a right wrist key point as a center and a connection line 4-2 between the right wrist key point and a right shoulder key point of the human body as a side length, to obtain a square image including a right hand.

Figure 8A:
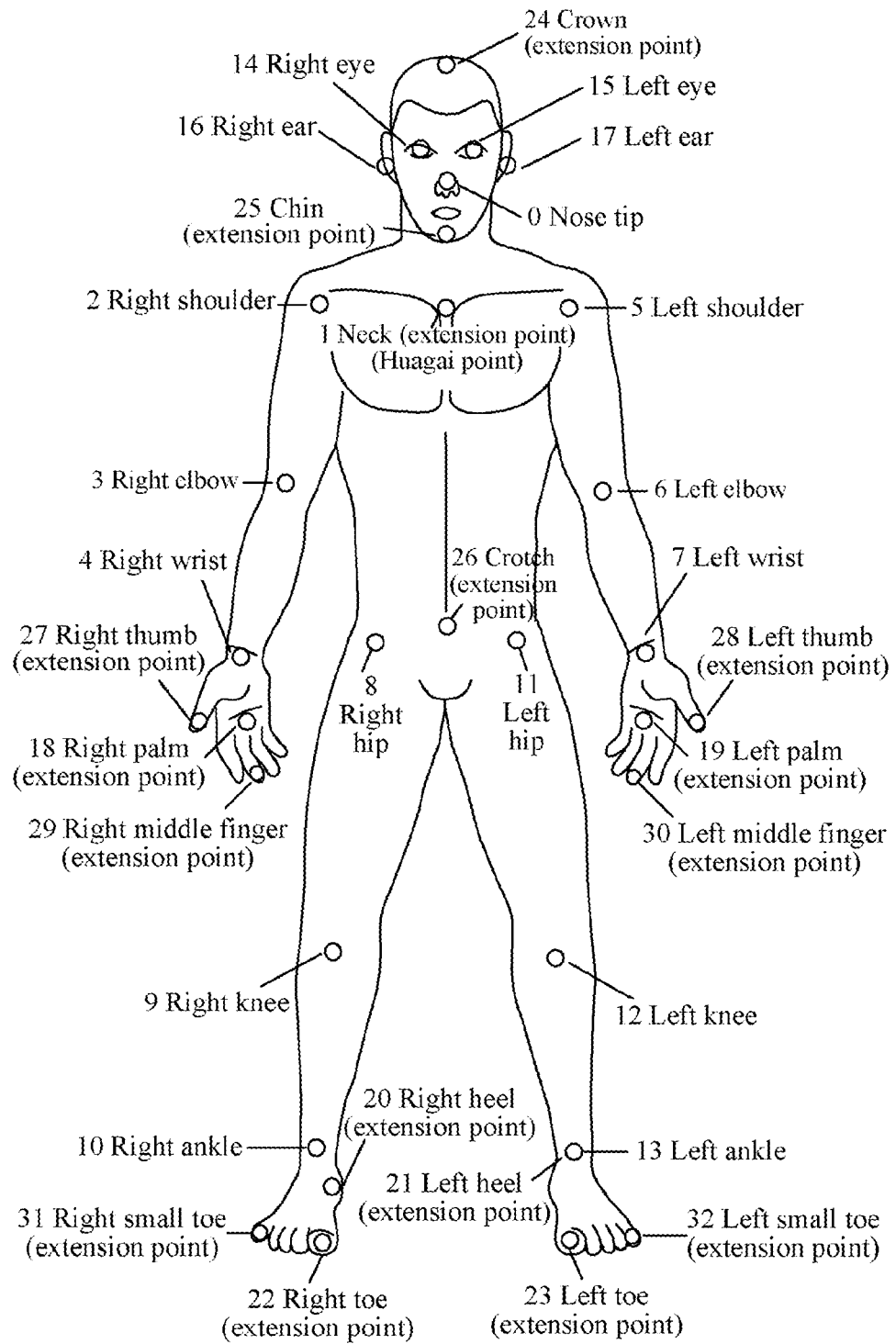
FIG. 8A is a schematic diagram of human body key points corresponding to a first setting according to an embodiment of this application.
Figure 8B:
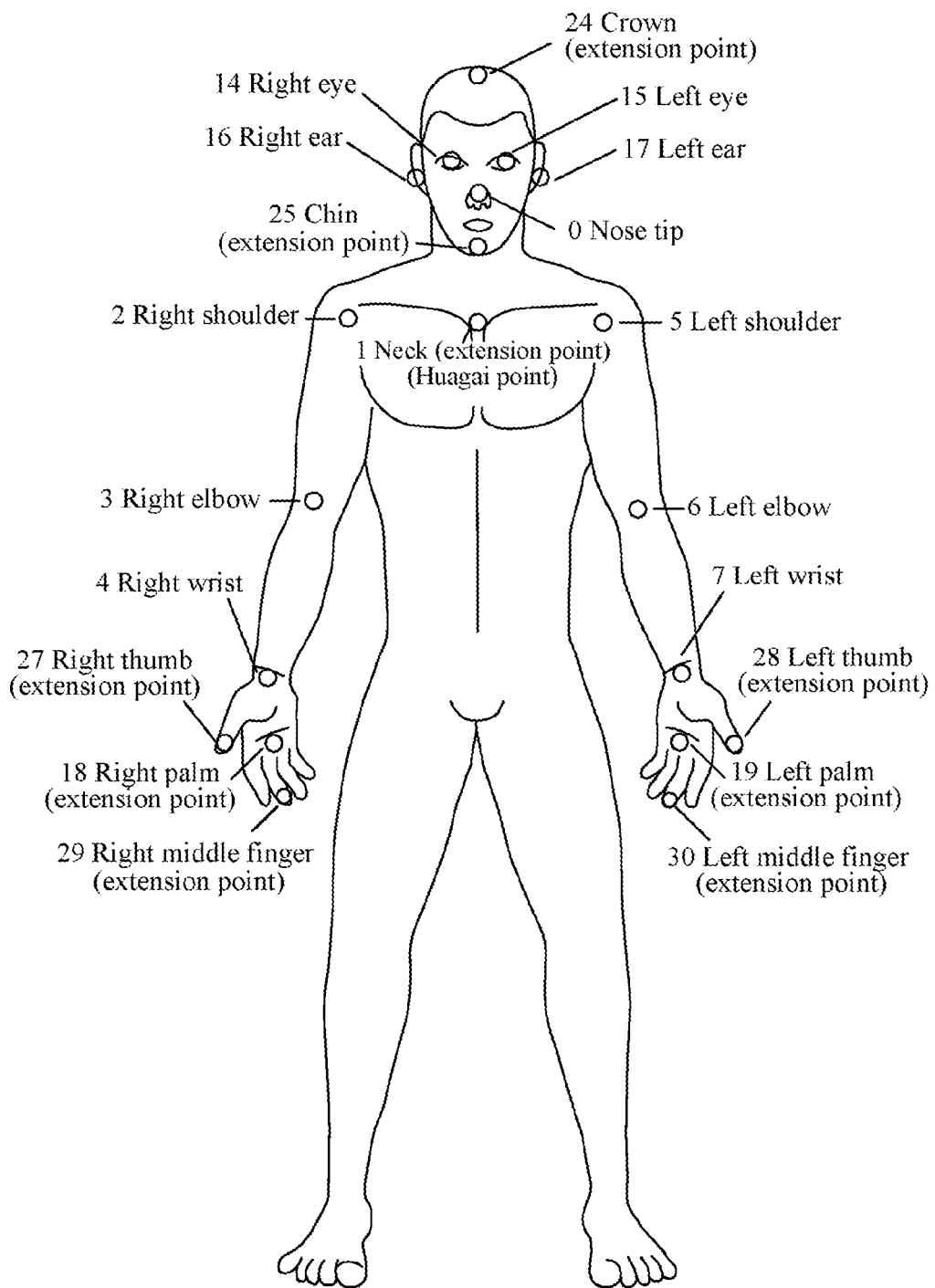
FIG. 8B is a schematic diagram of human body key points corresponding to a second setting according to an embodiment of this application.
Figure 8C:
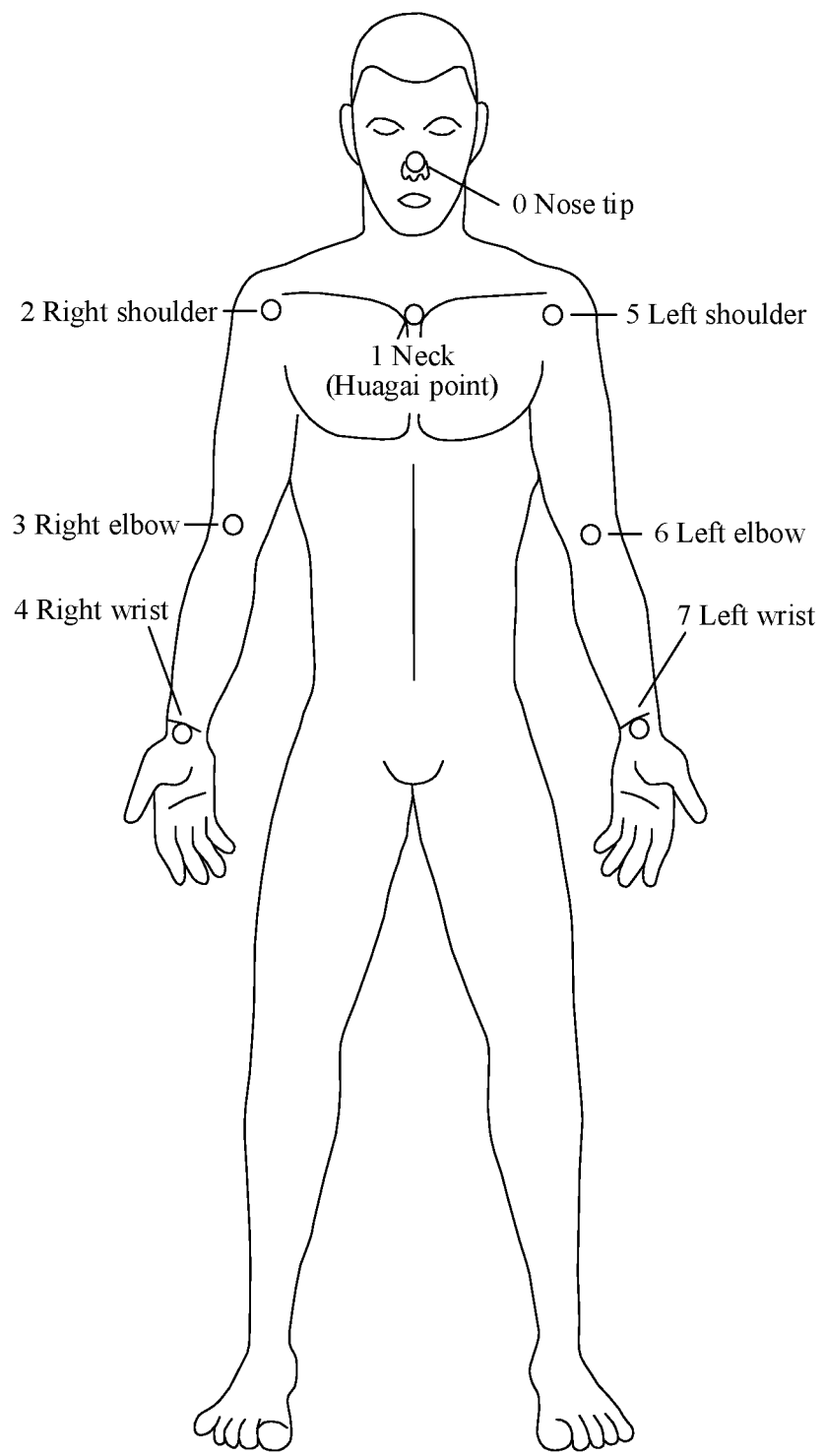
FIG. 8C is a schematic diagram of human body key points corresponding to a third setting according to an embodiment of this application.
Figure 8D:
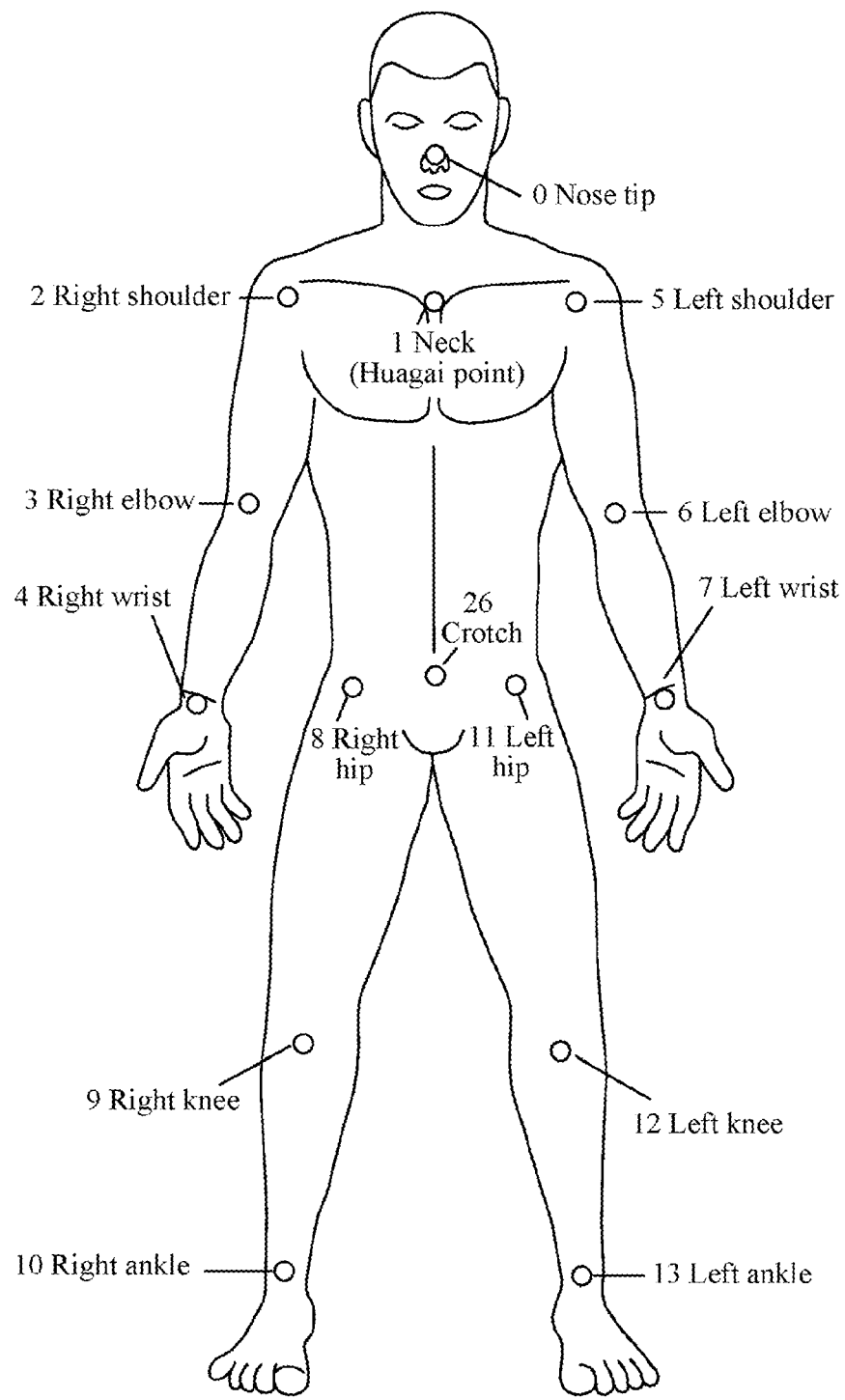
FIG. 8D is a schematic diagram of human body key points corresponding to a fourth setting according to an embodiment of this application.

Based on the foregoing descriptions on the key point set, the setting is introduced below. FIG. 8A to FIG. 8D are schematic diagrams of human body key points corresponding to different settings according to embodiments of this application. In some embodiments, four settings may be included, and respectively correspond to different quantities of human body key points in the key point set. An example in which the key point set is the foregoing 33-key point set is used. FIG. 8A is a schematic diagram of human body key points corresponding to a first setting according to an embodiment of this application. The first setting can correspond to all key points in the key point set (that is, 33 human body key points). FIG. 8B is a schematic diagram of human body key points corresponding to a second setting according to an embodiment of this application. The second setting may correspond to 20 human body key points of the upper body of the human body in the key point set. FIG. 8C is a schematic diagram of human body key points corresponding to a third setting according to an embodiment of this application. The third setting may correspond to 8 human body key points of the upper body of the human body in the key point set. FIG. 8D is a schematic diagram of human body key points corresponding to a fourth setting according to an embodiment of this application. The fourth setting may correspond to 15 human body key points of the whole human body in the key point set.

Figure 9:
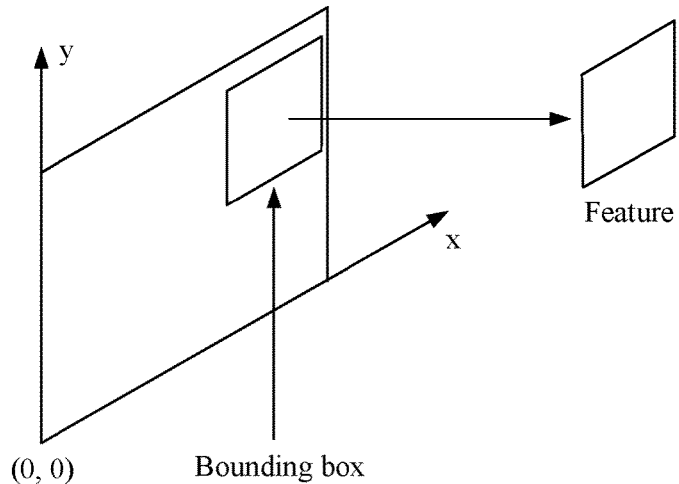
FIG. 9 is a schematic diagram of performing feature map extraction according to an embodiment of this application.

In some embodiments, the feature map model included in the pose recognition model may be a neural network model based on a Darknet framework. Feature extraction may be performed on an inputted image (such as a sample image) by using the feature map model, to obtain a corresponding feature map. FIG. 9 is a schematic diagram of performing feature map extraction according to an embodiment of this application. Referring to FIG. 9, when the feature map model performs feature extraction, the Darknet framework is used, and a feature map corresponding to the input image may be obtained based on a bounding box (bbox) and in a manner of sliding a window. The bounding box refers to a rectangular box with a smallest area that can exactly surround an object and is used for calibrating a position and a relative size of the object and defining a range occupied by the object in an image.

Step 602: Process the feature map of the sample image by using a 2D model included in the pose recognition model, to obtain 2D key point parameters used for representing a 2D human body pose.

The server inputs the feature map into a 2D model included in the pose recognition model, to output 2D key point parameters used for representing a 2D human body pose.

In some embodiments, the 2D model may be a convolutional neural network model, and the outputted 2D key point parameter may include a PAF parameter of the human body key points and a heatmap of the human body key points.

The PAF parameter of the human body key points may be a 2D direction vector corresponding to the human body key points, represents a position and a direction of a human body bone joint (limb), and also represents a degree of an association between two human body key points. Further, an owner of the human body key points can be determined based on the PAF parameter of the human body key points. In an actual application, the PAF parameter of the human body key points may include a coordinate parameter of the human body key points.

Figure 10:
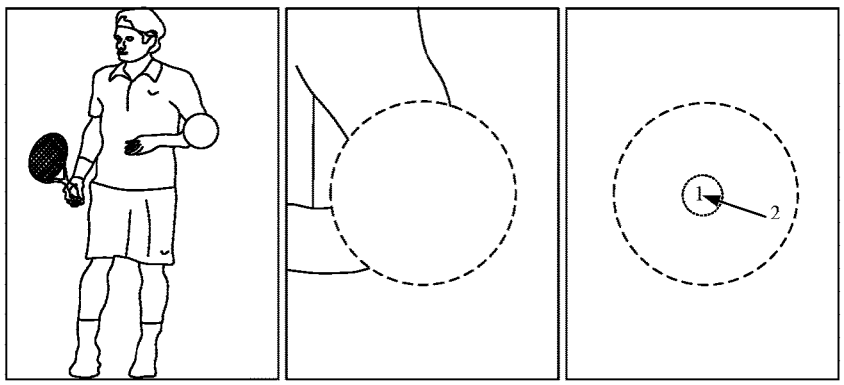
FIG. 10 is a schematic diagram of a human body key point heatmap according to an embodiment of this application.

The heatmap of the human body key points refers to indicating the human body key points at a same position by using a circular Gaussian in a grayscale image of at an original image size, that is, representing a probability that a pixel in the inputted feature map is a human body key point. FIG. 10 is a schematic diagram of a human body key point heatmap according to an embodiment of this application. Referring to FIG. 10, for a left elbow key point of the human body, the heatmap represents a probability that a pixel is the left elbow key point. That is, a probability that the left elbow key point appears at the pixel point is reflected in a probability expression form. A shorter distance between the pixel point and the left elbow key point indicates a higher probability, and a longer distance between the pixel and the left elbow key point indicates a lower the probability. That is, the probability that the pixel point (for example, the number 2 in FIG. 10) is the left elbow key point and a relative position relationship between the pixel point and a center point (for example, the number 1 in FIG. 10) conform to Gaussian distribution.

Step 603: Process, by using a 3D model included in the pose recognition model, a target human body feature map cropped from the feature map and the 2D key point parameter, to obtain 3D pose parameters used for representing a 3D human body pose.

The server may input a target human body feature map cropped from the feature map and the 2D key point parameter into a 3D model included in the pose recognition model, to output 3D pose parameters used for representing a 3D human body pose.

During actual implementation, the 3D pose parameter of the human body outputted by the 3D model corresponds to a single human body. Therefore, before the feature map is inputted into the 3D model, if the sample image includes a plurality of human bodies, the feature map outputted by the feature map model can be cropped based on a target human body. In some embodiments, the server may implement cropping of the feature map in the following manner:

The server determines a target human body in the feature map based on the 2D key point parameter outputted by the 2D model, and crops the feature map according to the determined target human body, to obtain the target human body feature map. That is, the inputted sample image of the feature map model may include a plurality of human bodies, a human body to which the human body key points belong is determined based on the 2D key point parameter obtained through recognition performed by the 2D model, and further, cropping is performed based on the single human body is cropped, to obtain a feature map corresponding to the single human body.

In some embodiments, the 3D model may be a convolutional neural network model. The server concatenates the target human body feature map obtained through cropping and the heatmap of the human body key points outputted by the 2D model, and inputs a concatenation result to the 3D model. For example, the feature map of the target human body and the heatmap of the human body key points are concatenated, that is, the heatmap and the feature map are concatenated as two matrices. The concatenation result is inputted into the 3D model.

In some embodiments, the 3D pose parameter outputted by the 3D model includes a shape parameter (shape) and a pose parameter (pose) of the human body. The shape parameter may represent a height and fatness of the human body. The pose parameter may represent a pose of the human body. A 3D skinned model of the human body can be constructed based on the 3D pose parameter of the human body.

Step 604: Construct a target loss function based on the 2D key point parameters and the 3D pose parameters.

In some embodiments, the target loss function of the pose recognition model includes a first loss function corresponding to the 3D model. The server may construct the first loss function in the following manner: The server determines corresponding 2D key point information based on the 3D pose parameter outputted by the 3D model, and constructs, based on the 2D key point parameter outputted by the 2D model and the obtained 2D key point information, the first loss function corresponding to the 3D model. It can be learned that the construction of the first loss function corresponding to the 3D model is constrained by using the 2D key point information, so that the output accuracy of the 3D model is higher.

Exemplarily, the server calculates, based on the shape parameter and the pose parameter included in the 3D pose parameter, a position of a 2D human body key point by using a projection matrix function, and then, constructs the first loss function corresponding to the 3D model based on a difference between a position of the human body key point in the key point set and the position of the 2D human body key point calculated based on the 3D pose parameter and a difference between a position of the 2D human body key point outputted by the 2D model and the position of the 2D human body key point calculated based on the 3D pose parameter.

For example, in an actual application, the constructed first loss function Loss1 may be:

$$Loss1 = av(Xgt - r(Xp))^2 + b(X2dp - r(Xp))^2 \qquad (1)$$

Correspondingly, a constraint of the first loss function is:

$$\min Loss(Xgt, r, a, b) = av|(Xgt) - r(Xp)| + b|X2dp - r(Xp)| \qquad (2)$$

where a and b are both weighting coefficients in the first loss function; v indicates whether a human body key point X is visible in the 2D image; Xp is the 3D pose parameter outputted by the 3D model, that is, the shape parameter and the pose parameter; r(Xp) represents a position of a 2D human body key point inversely calculated based on the 3D pose parameter and by using a projection matrix function r( ); Xgt represents a position of the human body key point X in the key point set; and X2dp is a position of the human body key point X predicted by the 2D model.

Based on the foregoing functions (1) and (2), it can be learned that the 2D human body pose information is used as a constraint in the constructed first loss function corresponding to the 3D model. In this way, the accuracy of the 3D pose parameter outputted by the 3D model can be improved.

In some embodiments, the target loss function of the pose recognition model further includes a loss function corresponding to the 2D model and a second loss function corresponding to the 3D model. Correspondingly, the server may construct the loss function corresponding to the 2D model and the second loss function corresponding to the 3D model in the following manner:

The loss function corresponding to the 2D model is constructed based on a difference between a PAF parameter outputted by the 2D model and the PAF parameter of the human body key points in the sample image and a difference between a heatmap outputted by the 2D model and the heatmap of the corresponding human body key points in the sample image.

The second loss function corresponding to the 3D model is constructed based on a difference between a shape parameter outputted by the 3D model and the shape parameter of the corresponding human body in the sample image and a difference between a pose parameter outputted by the 3D model and the pose parameter of the corresponding human body in the sample image.

For example, in an actual application, the constructed loss function Loss2 corresponding to the 2D model may be:

$$\text{Loss2} = (PAF - PAF')^2 + (\text{heatmap} - \text{heatmap}')^2 \quad (3)$$

where $(PAF-PAF')^2$ represents a difference between a PAF parameter outputted by the 2D model and the PAF parameter of the corresponding human body key points in the sample image, and $(\text{heatmap}-\text{heatmap}')^2$ represents a difference between a pose parameter outputted by the 3D model and the pose parameter of the corresponding human body in the sample image.

For example, in an actual application, the constructed second loss function Loss3 corresponding to the 3D model may be:

$$\text{Loss3} = (\beta - \beta')^2 + (\theta - \theta')^2 \quad (4)$$

where $\beta$ is a shape parameter of the human body, $\theta$ is a pose parameter of the human body, $(\beta-\beta')^2$ represents a difference between a shape parameter outputted by the 3D model and the shape parameter of the corresponding human body in the sample image and $(\theta-\theta')^2$ represents a difference between a pose parameter outputted by the 3D model and the pose parameter of the corresponding human body in the sample image.

Based on the foregoing descriptions of the loss function of the 2D model included in the pose recognition model and the loss functions of the 3D model included in the pose recognition model, it may be learned that in some embodiments, the target loss function of the pose recognition model may be:

$$\text{Loss} = (PAF-PAF')^2 + (\text{heatmap}-\text{heatmap}')^2 + (\beta-\beta')^2 + (\theta-\theta')^2 + av(Xgt - r(Xp))^2 + b(X2dp - r(Xp))^2 \quad (5)$$

Step 605: Update the pose recognition model based on the target loss function.

In some embodiments, the server may update a model parameter of the pose recognition model in the following manner:

The server determines a value of the target loss function based on the 2D key point parameter outputted by the 2D model and the 3D pose parameter outputted by the 3D model, determines whether the value of the target loss function exceeds a preset threshold, determines an error signal of the pose recognition model based on the target loss function in a case that the value of the target loss function exceeds the preset threshold, back-propagates the error signal in the pose recognition model, and update a model parameter of each layer during the propagation.

The back-propagation is described herein. Training sample data is inputted into an input layer of a neural network model, passes through a hidden layer, and finally, and reaches an output layer, and a result is outputted, which is a forward propagation process of the neural network model. Because there is an error between an output result of the neural network model and an actual result, an error between the output result and an actual value is calculated, and the error is back-propagated from the output layer to the hidden layer until it is propagated to the input layer. In the back-propagation process, the value of the model parameter is adjusted according to the error. The foregoing process is continuously iterated until convergence is achieved.

An example in which the target loss function of the pose recognition model is (5) is used. The server determines an error signal based on the target loss function, and back-propagates the error signal respectively from an output layer of the 2D model and an output layer of the 3D model layer by layer. The error signal is propagated to each layer. When the error signal reaches each layer, a gradient is calculated (that is, a partial derivative of the Loss function for a parameter of the layer) based on the propagated error signal, the parameter of the layer is updated based on the corresponding gradient.

Figure 11:
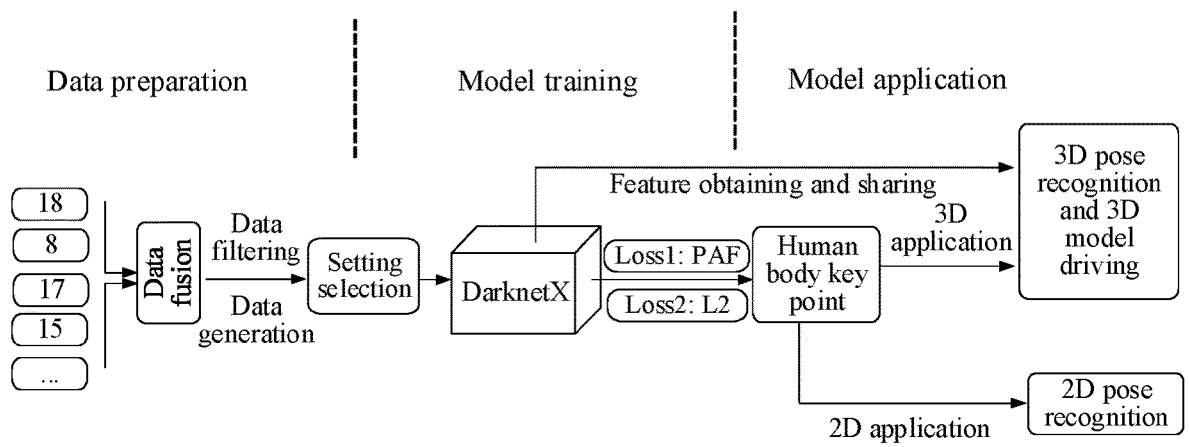
FIG. 11 is a schematic flowchart of a method for image recognition based on a pose recognition model according to an embodiment of this application.

In some embodiments, FIG. 11 is a schematic flowchart of a method for image recognition based on a pose recognition model according to an embodiment of this application. As shown in FIG. 11, the method for image recognition based on a pose recognition model provided in the embodiments of this application mainly includes three stages, namely, a data preparation stage, a model training stage, and a model application stage, which are respectively described below.

1. Data Preparation Stage:

In the data preparation stage, construction of a key point set including 33 human body key points and selection of different quantities of human body key points corresponding to different settings are mainly implemented.

In the key point set used in this embodiment, based on the 17 human body key points of the COCO data set (which may alternatively be 18 human body key points of Openpose), key points of the crown and the chin are added, to conveniently represent rotation of nodding and head raising; key points of a middle finger and a thumb are added to a wrist part, and represent, together with palm key point, rotation of the wrist; for compatibility with a common root point at the crotch in the 3D model and information about related bones, a crotch key point is added; and 3D information of feet is also represented by heels, the left toe, and the right toe on the feet. The key point set includes a total of 33 human body key points. By using the newly-added extension key points, more information about the 3D rotation of the body is included in the 2D pose recognition process.

During actual implementation, the constructed key point set includes 17 human body key points provided by the COCO data set, and the remaining 16 human body key points are extension key points. Extension key points of the hand and foot parts may be obtained through mean point addition and separate recognition based on 17 human body key points, and data of the 33 points is obtained through data fusion. For example, the crotch key point may be calculated based on the left hip key point and the right hip key point, and the neck (Huagai point) key point may be calculated based on the left shoulder key point and the right shoulder key point.

During actual implementation, the extension key point may be obtained through recognition by using a detection model for key points of hand and foot parts provided in the related art, or by separately training a detection model for recognizing extension key points of the corresponding hand and foot parts, so that the detection model has a property of outputting corresponding extension key point information based on an inputted image including a hand or a foot. For cropping of the image before the image is inputted into the detection model, reference may be made to the description in the foregoing embodiments, and details are not described herein again.

In an actual application, for different settings, different quantities of human body key points are labeled in a sample image used for pose recognition model training. For example, for the setting of 20 human body key points of the upper body of the human body, during model training, only the 20 human body key points in a sample image may be labeled, to avoid a waste of computing resources caused by labeling 33 human body key points.

2. Model Training Stage:

In some embodiments, the model obtained through training is a fully convolutional network (FCN) model, including three parts, namely, a feature map model (for example, DarknetX), a 2D model, and a 3D model, to implement joint training of the 2D model and the 3D model. During model training, a corresponding setting is selected according to service requirements, that is, a corresponding human body key point setting is selected. A feature map outputted by DarknetX is inputted into the 2D model, and is trained through the PAF and the heatmap and by using the loss of L2, positions and direction information of 2D human body key points are obtained through NMS and a Grouping operation of the PAF, and an owner of the human body key points is determined. During joint training of the 3D model, the feature map outputted by DarknetX needs to be cropped, to obtain a target human body feature map of a single human body, and then, the target human body feature map is concatenated with the heatmap outputted by the 2D model as an input of the 3D model, which mainly is using 2D human body key points to reduce a calculation amount required by the 3D model. Only a status of a target single person needs to be regressed, and the feature map outputted by the DarknetX is shared and multiplexed.

3. Model Application Stage:

The 3D information of the human body outputted by the model may be used for 3D pose recognition of the human body and driving a 3D skinned model, for example, driving, according to an obtained 3D pose parameter (shape and pose) of a user, a 3D character model to synchronize with an action of the user.

The 2D human body information outputted by the model may be used for 2D pose recognition of the human body, and in an actual application, may be used for recognition of a static action and recognition of sequential actions. For example, a screen of the terminal displays an action of an animated role, the terminal acquires an action made by a user by imitating the animated role, and the terminal performs 2D pose recognition, and scores according to an action matching degree.

Figure 12:
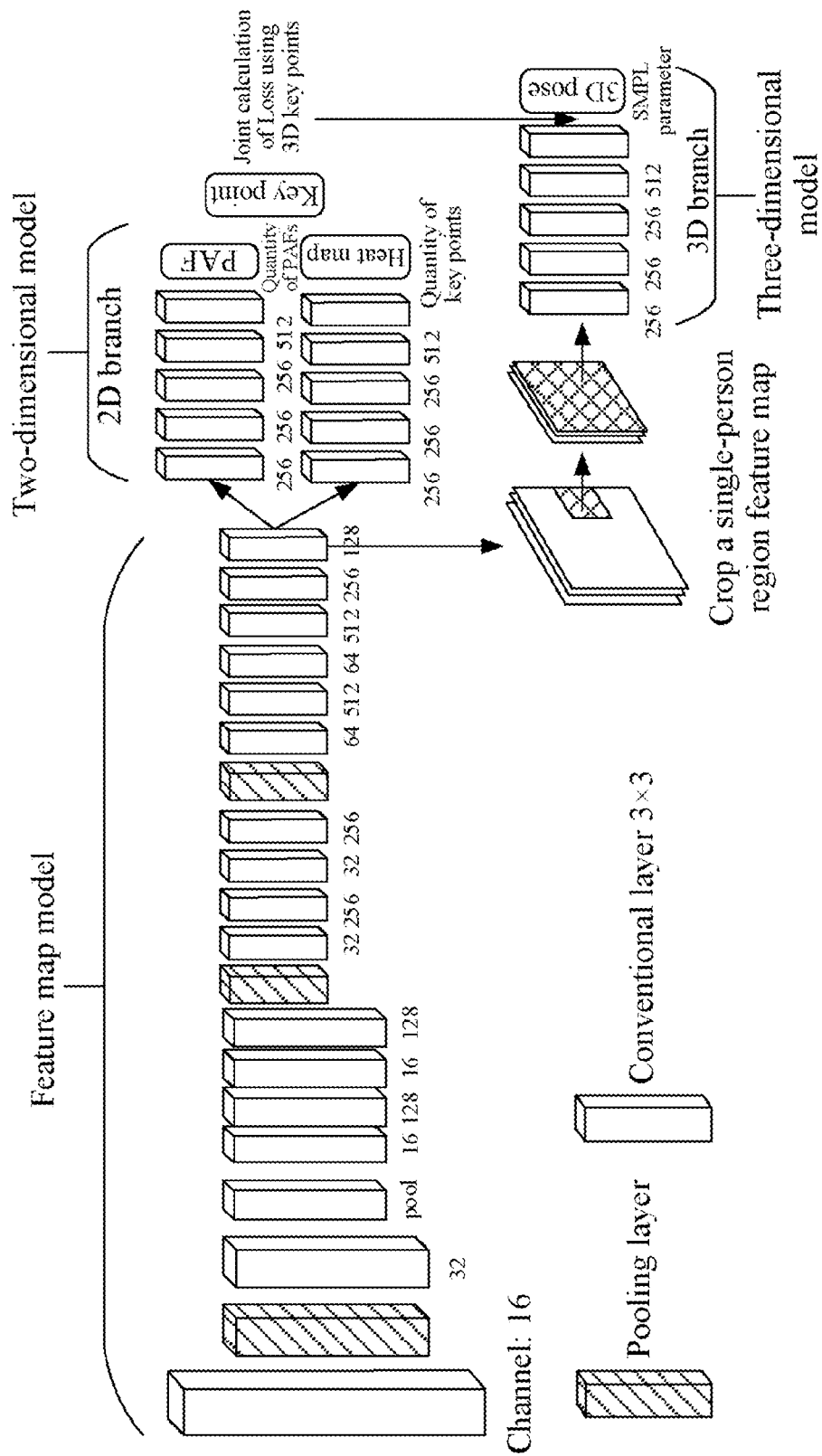
FIG. 12 is a schematic flowchart of performing image recognition by using a pose recognition model according to an embodiment of this application.

An application of the pose recognition model obtained through training in the embodiments of this application is described below. In some embodiments, the pose recognition model may be configured for image recognition. An example in which an image recognition client is configured in a terminal is used. FIG. 12 is a schematic flowchart of performing image recognition by using a pose recognition model according to an embodiment of this application. Referring to FIG. 12, the terminal inputs a to-be-recognized image including a human body into a feature map model included in the pose recognition model, to output a feature map corresponding to the to-be-recognized image; inputs the feature map into a 2D model included in the pose recognition model, to output a 2D key point parameter used for representing a 2D human body pose, the 2D key point parameter being used for recognizing a 2D pose of the human body; and inputs a target human body feature map cropped from the feature map and the 2D key point parameter into a 3D model included in the pose recognition model, to output a 3D pose parameter used for representing a 3D human body pose, the 3D pose parameter being used for recognizing a 3D pose of the human body.

In some embodiments, after outputting an image of a specific human pose, the terminal acquires a to-be-recognized image. The terminal recognizes a 2D pose of the human body in the to-be-recognized image based on the 2D key point parameter outputted by the 2D model, performs similarity matching between the 2D pose and the specific human pose, to obtain a matching result, and outputs prompt information used for representing the matching result.

Figure 13:
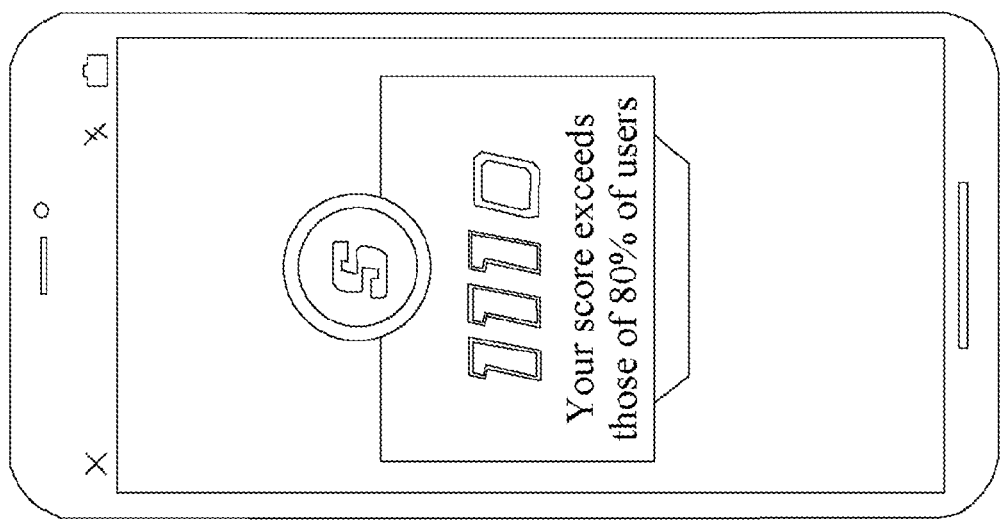
FIG. 13 is a schematic diagram of an application scenario of a pose recognition model according to an embodiment of this application.
Figure 13:
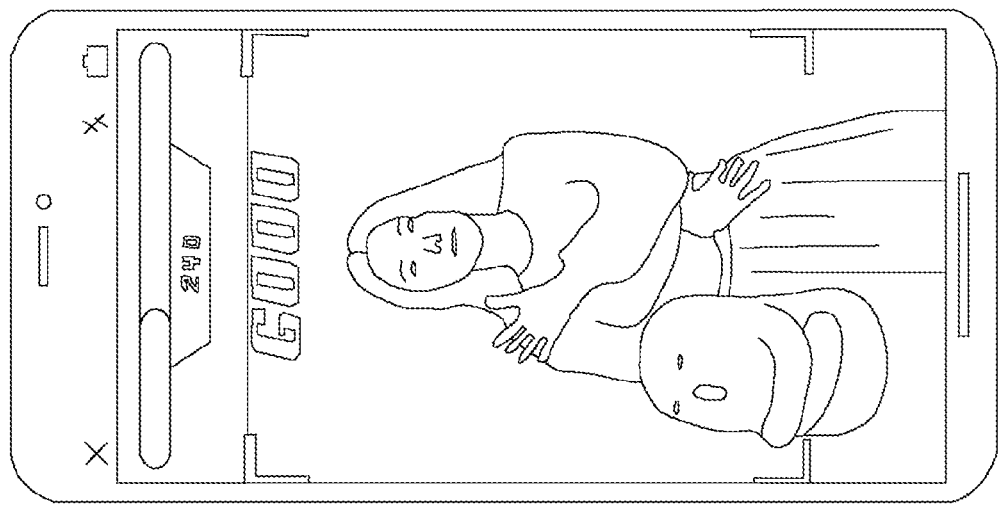

Exemplarily, an example in which a dance game client is configured in a terminal is used. FIG. 13 is a schematic diagram of an application scenario of a pose recognition model according to an embodiment of this application. Referring to FIG. 13, the terminal shows an action of an animated role, that is, a specific human pose, by using a dance game client. A user makes a corresponding action according to an action prompt on a screen of the terminal. The terminal acquires an action image of the user as a to-be-recognized image, inputs the to-be-recognized image into a pose recognition model for 2D human body pose recognition, performs similarity matching between a recognition result and the pose of the animated role, and outputs corresponding prompt information according to an obtained similarity, for example, outputs a corresponding score or a prompt such as "great", "good", or "miss".

In some embodiments, the terminal constructs, based on the 3D pose parameter outputted by the 3D model, a 3D human body model corresponding to the target human body, and controls the 3D human body model to perform a target action, the target action matching an action performed by the target human body.

Figure 14:
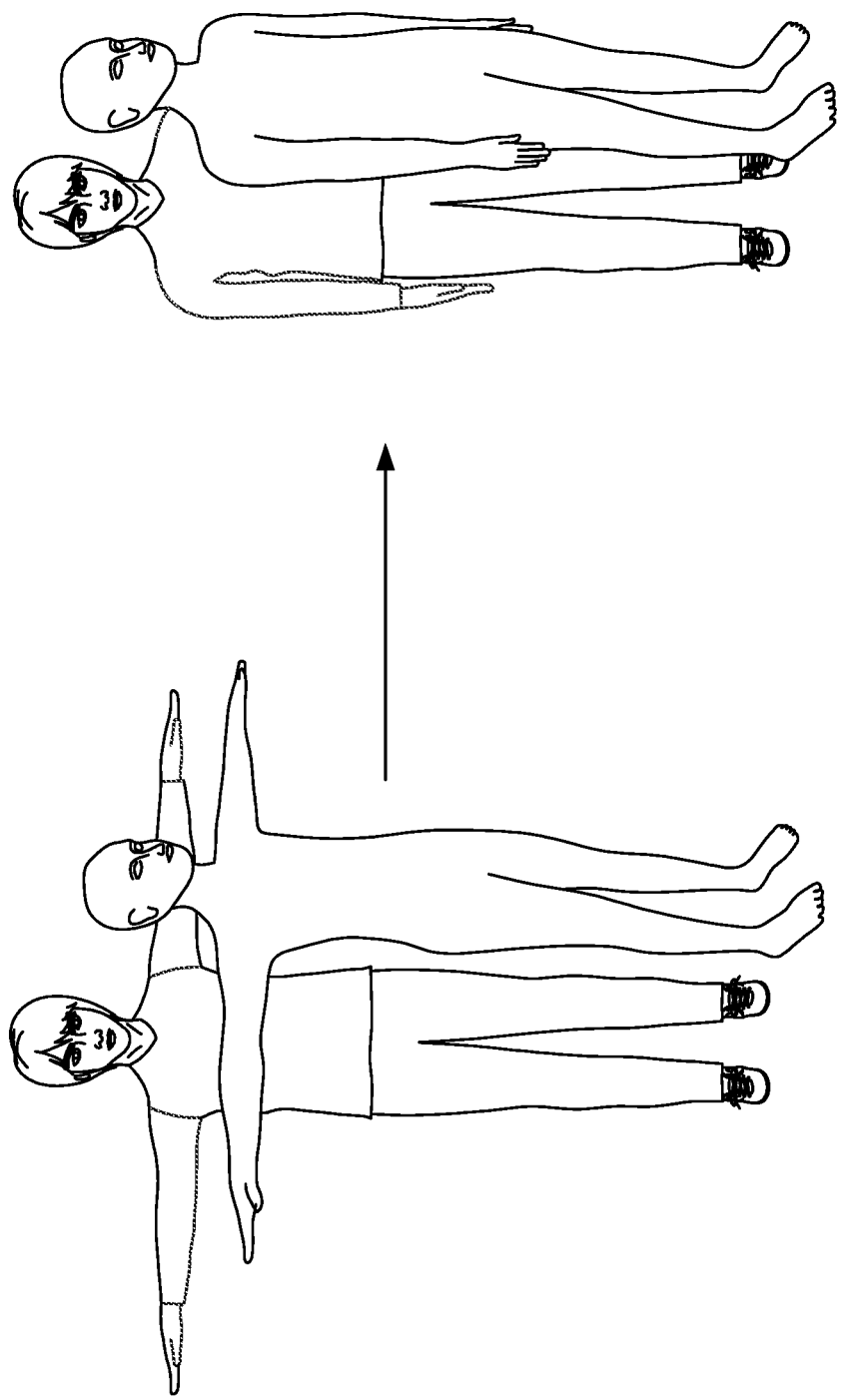
FIG. 14 is a schematic diagram of an application scenario of a pose recognition model according to an embodiment of this application.

Exemplarily, an example in which a 3D human body modeling client is configured in a terminal is used. FIG. 14 is a schematic diagram of an application scenario of a pose recognition model according to an embodiment of this application. Referring to FIG. 14, the terminal acquires an image of a user to obtain a to-be-recognized image, inputs the to-be-recognized image into the pose recognition model, performs 3D human body pose recognition, constructs a 3D skinned model based on an outputted 3D pose parameter, and controls the 3D skinned model to synchronize with an action of the user.

Figure 15:
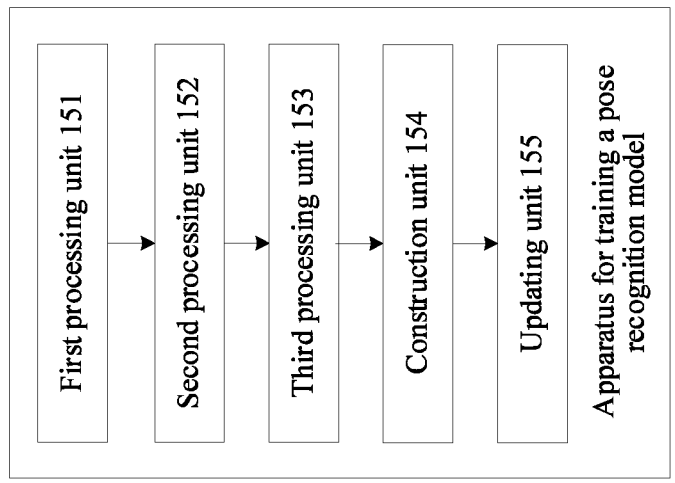
FIG. 15 is a schematic diagram of a composition structure of an apparatus for training a pose recognition model according to an embodiment of this application.

The apparatus provided in the embodiments of this application is described below by using implementation of software units. FIG. 15 is a schematic diagram of a composition structure of an apparatus for training a pose recognition model according to an embodiment of this application. Referring to FIG. 15, an apparatus for training a pose recognition model of this embodiment of this application includes:

a first processing unit 151, configured to process, by using a feature map model included in a pose recognition model, a sample image labeled with human body key points, to obtain a feature map of the sample image;

a second processing unit 152, configured to process the feature map by using a 2D model included in the pose recognition model, to obtain a 2D key point parameter used for representing a 2D human body pose;

a third processing unit 153, configured to process, by using a 3D model included in the pose recognition model, a target human body feature map cropped from the feature map and the 2D key point parameter, to obtain a 3D pose parameter used for representing a 3D human body pose;

a construction unit 154, configured to construct a target loss function based on the 2D key point parameter and the 3D pose parameter; and an updating unit 155, configured to update a model parameter of the pose recognition model based on the target loss function.

In some embodiments, the apparatus further includes:

a labeling unit, configured to determine the human body key points in the key point set according to a setting; and label the sample image based on the human body key points and with reference to the key point set.

In some embodiments, the key point set includes:

reference key points used for localization of human body parts and extension key points, which, together with the reference key points, represent different 3D poses of the parts to which the reference key points and the extension key points belong.

In some embodiments, the target loss function includes a first loss function corresponding to the 3D model.

The construction unit is further configured to determine corresponding 2D key point information based on the 3D pose parameter; and construct the first loss function based on the 2D key point parameter and the 2D key point information.

In some embodiments, the target loss function further includes a loss function corresponding to the 2D model and a second loss function corresponding to the 3D model. The 2D key point parameter includes a PAF parameter of the human body key points and a heatmap of the human body key points, and the 3D pose parameter includes a shape parameter and a pose parameter of a human body.

The construction unit is further configured to construct the loss function corresponding to the 2D model based on a difference between a PAF parameter outputted by the 2D model and the PAF parameter of the human body key points in the sample image and a difference between a heatmap outputted by the 2D model and the heatmap of the corresponding human body key points in the sample image; and construct the second loss function corresponding to the 3D model based on a difference between a shape parameter outputted by the 3D model and the shape parameter of the corresponding human body in the sample image and a difference between a pose parameter outputted by the 3D model and the pose parameter of the corresponding human body in the sample image.

In some embodiments, the apparatus further includes:

a cropping unit, configured to determine the target human body in the feature map based on the 2D key point parameter; and crop the feature map according to the target human body, to obtain the target human body feature map.

In some embodiments, the updating unit is further configured to determine a value of the target loss function based on the 2D key point parameter and the 3D pose parameter;

determine an error signal of the pose recognition model based on the target loss function in a case that the value of the target loss function exceeds a preset threshold; and back-propagate the error signal in the pose recognition model, and update a model parameter of each layer during the propagation.

Figure 16:
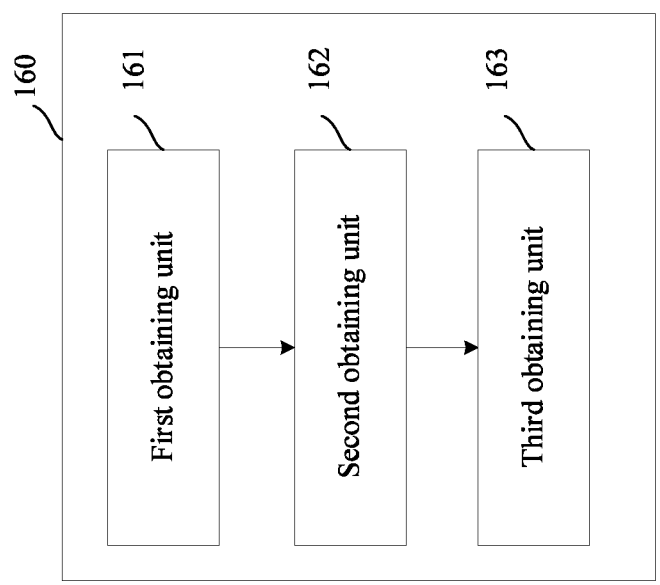
FIG. 16 is a schematic diagram of a composition structure of an apparatus for image recognition based on a pose recognition model according to an embodiment of this application.

FIG. 16 is a schematic diagram of a composition structure of an apparatus for image recognition based on a pose recognition model according to an embodiment of this application. Referring to FIG. 16, an apparatus 160 for image recognition based on a pose recognition model of this embodiment of this application includes:

a first acquisition unit 161, configured to process, by using a feature map model included in the pose recognition model, a to-be-recognized image including a human body, to obtain a feature map corresponding to the to-be-recognized image;

a second acquisition unit 162, configured to process the feature map by using a 2D model included in the pose recognition model, to obtain a 2D key point parameter used for representing a 2D human body pose, the 2D key point parameter being used for recognizing a 2D pose of the human body; and a third acquisition unit 163, configured to process, by using a 3D model included in the pose recognition model, a target human body feature map cropped from the feature map and the 2D key point parameter, to obtain a 3D pose parameter used for representing a 3D human body pose, the 3D pose parameter being used for recognizing a 3D pose of the human body.

In some embodiments, the apparatus further includes:

a matching unit, configured to recognize a 2D pose of the human body in the to-be-recognized image based on the 2D key point parameter, the to-be-recognized image being acquired based on an outputted image of a specific human pose;

perform similarity matching between the recognized 2D pose and the specific human pose, to obtain a matching result; and a prompting unit, configured to output prompt information used for representing the matching result.

In some embodiments, the apparatus further includes:

a human body model unit, configured to construct, based on the 3D pose parameter, a 3D human body model corresponding to the target human body; and a control unit, configured to control the 3D human body model to perform a target action, the target action matching an action performed by the target human body.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions related to the apparatuses are similar to the descriptions of the foregoing methods. For the descriptions of beneficial effects of the same methods, details are not described again. For technical details of the apparatuses not disclosed in the embodiments of this application, refer to the descriptions of the method embodiments in this application.

The embodiments of this application further provide a storage medium storing executable instructions, the executable instructions, when executed by a processor, causing the processor to perform the method for training a pose recognition model provided in the embodiments of this application.

The embodiments of this application further provide a storage medium storing executable instructions, the executable instructions, when executed by a processor, causing the processor to perform the method for image recognition based on a pose recognition model in the embodiments of this application.

In some embodiments, the storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for training a pose recognition model, applicable to a computer device, the method comprising:
processing, by using a feature map model comprised in a pose recognition model, a sample image labeled with human body key points, to obtain a feature map of the sample image;
processing the feature map of the sample image by using a two-dimensional (2D) model comprised in the pose recognition model, to obtain 2D key point parameters used for representing a 2D human body pose;
processing, by using a three-dimensional (3D) model comprised in the pose recognition model, a target human body feature map cropped from the feature map and the 2D key point parameters, to obtain 3D pose parameters used for representing a 3D human body pose;
constructing a target loss function based on the 2D key point parameters and the 3D pose parameters; and
updating the pose recognition model based on the target loss function.

2. The method according to claim 1, wherein before the processing, by using a feature map model comprised in a pose recognition model, a sample image labeled with human body key points, to obtain a feature map of the sample image, the method further comprises:
determining the human body key points in a key point set according to a setting; and
labeling the sample image based on the human body key points and with reference to the key point set.

3. The method according to claim 2, wherein the key point set comprises:
reference key points used for localization of human body parts and extension key points, which, together with the reference key points, represent a plurality of 3D poses of the parts to which the reference key points and the extension key points belong.

4. The method according to claim 1, wherein the target loss function comprises a first loss function corresponding to the 3D model; and the constructing a target loss function based on the 2D key point parameters and the 3D pose parameters comprises:
determining corresponding 2D key point information based on the 3D pose parameters; and
constructing the first loss function based on the 2D key point parameters and the 2D key point information.

5. The method according to claim 4, wherein the target loss function further comprises a loss function corresponding to the 2D model and a second loss function corresponding to the 3D model; the 2D key point parameters comprise a part affinity field (PAF) parameter of the human body key points and a heatmap of the human body key points, and the 3D pose parameters comprise a shape parameter and a pose parameter of a human body; and
the constructing a target loss function based on the 2D key point parameters and the 3D pose parameters comprises:
constructing the loss function corresponding to the 2D model based on a difference between a PAF parameter outputted by the 2D model and the PAF parameter of the human body key points in the sample image and a difference between a heatmap outputted by the 2D model and the heatmap of the corresponding human body key points in the sample image; and
constructing the second loss function corresponding to the 3D model based on a difference between a shape parameter outputted by the 3D model and the shape parameter of the corresponding human body in the sample image and a difference between a pose parameter outputted by the 3D model and the pose parameter of the corresponding human body in the sample image.

6. The method according to claim 1, wherein before the processing a target human body feature map cropped from the feature map and the 2D key point parameters by using a 3D model comprised in the pose recognition model, to obtain a 3D pose parameter used for representing a 3D human body pose, the method further comprises:
determining a target human body in the feature map based on the 2D key point parameters; and
cropping the feature map according to the target human body, to obtain the target human body feature map.

7. The method according to claim 1, wherein the updating a model parameter of the pose recognition model based on the target loss function comprises:
- determining a value of the target loss function based on the 2D key point parameters and the 3D pose parameters;
- determining an error signal of the pose recognition model based on the target loss function in a case that the value of the target loss function exceeds a preset threshold; and
- back-propagating the error signal in the pose recognition model, and updating a model parameter of each layer during the propagation.

8. The method according to claim 1, the method comprising:
- processing, by using the feature map model comprised in the pose recognition model, a to-be-recognized image comprising a human body, to obtain a feature map of the to-be-recognized image;
- processing the feature map of the to-be-recognized image by using the 2D model comprised in the pose recognition model, to obtain 2D key point parameters used for representing a 2D human body pose in the to-be-recognized image; and
- processing, by using the 3D model comprised in the pose recognition model, a target human body feature map cropped from the feature map and the 2D key point parameters, to obtain 3D pose parameters used for representing a 3D human body pose in the to-be-recognized image.

9. The method according to claim 8, further comprising:
- recognizing a 2D pose of the human body in the to-be-recognized image based on the 2D key point parameter, the to-be-recognized image being acquired based on an outputted image of a specific human pose;
- performing similarity matching between the 2D pose and the specific human pose, to obtain a matching result; and
- outputting prompt information used for representing the matching result.

10. The method according to claim 8, further comprising:
- constructing, based on the 3D pose parameter, a 3D human body model corresponding to the target human body; and
- controlling the 3D human body model to perform a target action, the target action matching an action performed by the target human body.

11. A computer device, comprising:
- a memory, configured to store executable instructions; and
- a processor, configured to perform, when executing the executable instructions stored in the memory, a plurality of operations including:
- processing, by using a feature map model comprised in a pose recognition model, a sample image labeled with human body key points, to obtain a feature map of the sample image;
- processing the feature map of the sample image by using a two-dimensional (2D) model comprised in the pose recognition model, to obtain 2D key point parameters used for representing a 2D human body pose;
- processing, by using a three-dimensional (3D) model comprised in the pose recognition model, a target human body feature map cropped from the feature map and the 2D key point parameters, to obtain 3D pose parameters used for representing a 3D human body pose;
- constructing a target loss function based on the 2D key point parameters and the 3D pose parameters; and
- updating the pose recognition model based on the target loss function.

12. The computer device according to claim 11, wherein the plurality of operations further comprise:
- before processing, by using a feature map model comprised in a pose recognition model, a sample image labeled with human body key points, to obtain a feature map of the sample image:
- determining the human body key points in a key point set according to a setting; and
- labeling the sample image based on the human body key points and with reference to the key point set.

13. The computer device according to claim 12, wherein the key point set comprises:
- reference key points used for localization of human body parts and extension key points, which, together with the reference key points, represent a plurality of 3D poses of the parts to which the reference key points and the extension key points belong.

14. The computer device according to claim 11, wherein the target loss function comprises a first loss function corresponding to the 3D model; and the constructing a target loss function based on the 2D key point parameters and the 3D pose parameters comprises:
- determining corresponding 2D key point information based on the 3D pose parameters; and
- constructing the first loss function based on the 2D key point parameters and the 2D key point information.

15. The computer device according to claim 11, wherein the plurality of operations further comprise:
- before processing a target human body feature map cropped from the feature map and the 2D key point parameters by using a 3D model comprised in the pose recognition model, to obtain a 3D pose parameter used for representing a 3D human body pose:
- determining a target human body in the feature map based on the 2D key point parameters; and
- cropping the feature map according to the target human body, to obtain the target human body feature map.

16. The computer device according to claim 11, wherein the updating a model parameter of the pose recognition model based on the target loss function comprises:
- determining a value of the target loss function based on the 2D key point parameters and the 3D pose parameters;
- determining an error signal of the pose recognition model based on the target loss function in a case that the value of the target loss function exceeds a preset threshold; and
- back-propagating the error signal in the pose recognition model, and updating a model parameter of each layer during the propagation.

17. The computer device according to claim 11, wherein the plurality of operations further comprise:
- processing, by using the feature map model comprised in the pose recognition model, a to-be-recognized image comprising a human body, to obtain a feature map of the to-be-recognized image;
- processing the feature map of the to-be-recognized image by using the 2D model comprised in the pose recognition model, to obtain 2D key point parameters used for representing a 2D human body pose in the to-be-recognized image; and
- processing, by using the 3D model comprised in the pose recognition model, a target human body feature map cropped from the feature map and the 2D key point parameters, to obtain 3D pose parameters used for representing a 3D human body pose in the to-be-recognized image.

18. A non-transitory computer-readable storage medium, storing executable instructions that, when executed by a processor of a computer device, cause the computer device to perform a plurality of operations including:

processing, by using a feature map model comprised in a pose recognition model, a sample image labeled with human body key points, to obtain a feature map of the sample image;

processing the feature map of the sample image by using a two-dimensional (2D) model comprised in the pose recognition model, to obtain 2D key point parameters used for representing a 2D human body pose;

processing, by using a three-dimensional (3D) model comprised in the pose recognition model, a target human body feature map cropped from the feature map and the 2D key point parameters, to obtain 3D pose parameters used for representing a 3D human body pose;

constructing a target loss function based on the 2D key point parameters and the 3D pose parameters; and updating the pose recognition model based on the target loss function.

19. The non-transitory computer-readable storage medium according to claim 18, wherein the plurality of operations further comprise:

before processing, by using a feature map model comprised in a pose recognition model, a sample image labeled with human body key points, to obtain a feature map of the sample image:

determining the human body key points in a key point set according to a setting; and labeling the sample image based on the human body key points and with reference to the key point set.

20. The non-transitory computer-readable storage medium according to claim 19, wherein the key point set comprises:

reference key points used for localization of human body parts and extension key points, which, together with the reference key points, represent a plurality of 3D poses of the parts to which the reference key points and the extension key points belong.

* * * * *